(12) United States Patent
Ludwig

(10) Patent No.: US 8,754,842 B2
(45) Date of Patent: Jun. 17, 2014

(54) COMBINED DISPLAY AND IMAGE CAPTURE WITHOUT SIMPLE OR COMPOUND LENSES FOR VIDEO CONFERENCING EYE-CONTACT AND OTHER APPLICATIONS

(75) Inventor: Lester F. Ludwig, Hillsborough, CA (US)

(73) Assignee: Lester F. Ludwig, San Antonio, TX (US)

( * ) Notice: Subject to any disclaimer, the term of this patent is extended or adjusted under 35 U.S.C. 154(b) by 550 days.

(21) Appl. No.: 12/419,229

(22) Filed: Apr. 6, 2009

(65) Prior Publication Data

US 2009/0231474 A1 Sep. 17, 2009

Related U.S. Application Data

(62) Division of application No. 09/601,384, filed as application No. PCT/US99/01789 on Jan. 27, 1999, now abandoned.

(60) Provisional application No. 60/072,762, filed on Jan. 27, 1998.

(51) Int. Cl.
*G09G 3/36* (2006.01)

(52) U.S. Cl.
USPC .............................. 345/104; 345/87; 348/252

(58) Field of Classification Search
USPC .............................. 345/104, 87; 348/252, 323
See application file for complete search history.

(56) References Cited

U.S. PATENT DOCUMENTS

| 4,935,812 | A | * | 6/1990 | Bernard | 375/240.25 |
| 4,991,020 | A | * | 2/1991 | Zwirn | 348/563 |
| 5,101,270 | A | * | 3/1992 | Boone et al. | 348/61 |
| 5,278,673 | A | * | 1/1994 | Scapa et al. | 358/473 |
| 5,835,627 | A | * | 11/1998 | Higgins et al. | 382/167 |
| 5,920,401 | A | * | 7/1999 | Street et al. | 358/400 |

* cited by examiner

*Primary Examiner* — William Boddie
*Assistant Examiner* — Saifeldin Elnafia
(74) *Attorney, Agent, or Firm* — Procopio, Cory, Hargreaves & Savitch LLP

(57) ABSTRACT

An integrated display and camera without simple or compound lenses comprising interleaved light-emitting and light-sensing/photosensor elements. Image formation without use of a simple or compound lens can be obtained via software algorithms operating on light-sensing measurements, for example implementing a two-dimensional deconvolution operation defined by the transfer function imposed by a microoptic array. For example, a microoptic aperture array can be configured to comprise localized optical overlaps which are readily deconvolved or otherwise solved for by an algorithm. Associated microoptic structures can be as simple as apertures or can be more complex, for example including microlenses. Display and photosensor elements can include color capabilities. Light-sensing elements can be similar, nearly, or essentially identical in structure and/or composition to the light-emitting element. Light-emitting elements can comprise an Organic Light Emitting Diode, and can be configured for light-detection modalities, for example emitting light and detecting light simultaneously. Applications include providing eye contact in video conferencing.

21 Claims, 25 Drawing Sheets

Figure 17

| R | b | G | r | B | g | R |
|---|---|---|---|---|---|---|
| g | R | b | G | r | B | g |
| B | g | R | b | G | r | B |
| r | B | g | R | b | G | r |
| G | r | B | g | R | b | g |
| b | G | r | B | g | R | b |
| B | b | G | r | B | g | R |

COMBINED DISPLAY AND IMAGE CAPTURE WITHOUT SIMPLE OR COMPOUND LENSES FOR VIDEO CONFERENCING EYE-CONTACT AND OTHER APPLICATIONS

CROSS-REFERENCE TO RELATED APPLICATIONS

This is a Divisional of U.S. patent application Ser. No. 09/601,384 filed Jul. 27, 2000, now abandoned which was an application filed under 35 U.S.C. §371 of International Patent Application Ser. No. PCT/US1999/001789, filed Jan. 27, 1999, which claims the benefit of U.S. Provisional Application Ser. No. 60/072,762, filed Jan. 27, 1998, the disclosures of all of which are incorporated herein by reference.

1. BACKGROUND OF THE INVENTION

1.1 Field of the Invention

The present invention relates generally to multimedia conferencing systems, and more particularly to multimedia-enabled communication and computing devices. Still more particularly, the present invention is a device for providing real-time multimedia conferencing capabilities to one or more companion computers or on a stand-alone basis.

1.2 Background

Early computers were large, clumsy, difficult-to-operate and unreliable room-sized systems shared within a single location. Similarly, early video and graphics teleconferencing systems suffered from the same drawbacks, and were also shared within a single location. With regard to computers, technological innovations enabled the advent of desktop "personal computers." Relative to teleconferencing systems, new technologies were also introduced, such as those described in U.S. Pat. No. 5,617,539, entitled "Multimedia Collaboration System with Separate Data Network and A/V Network Controlled by Information Transmitting on the Data Network," that brought high-quality, reliable video and graphics teleconferencing capabilities to a user's desktop. In both early desktop personal computers and conferencing systems, there were and remain many incompatible implementations.

Digital technology innovations targeted at working in conjunction with market forces gave rise to standardized desktop computer platforms, such as Microsoft/Intel machines and Apple machines, which have existing and strengthening unifying ties between them. The standardization of converging platforms unified fragmentations that existed within the computer hardware and software industries, such that immense economies of scale lowered the per-desktop development and manufacturing costs. This in turn greatly accelerated desktop computer usage and promoted the interworking between applications such as work processing, spreadsheet, and presentation tool applications that freely exchange data today. As a result, businesses employing such interworking applications became more efficient and productive. The push for greater efficiency has fueled the development of additional innovations, which further led to developments such as the explosion in electronic commerce as facilitated by the world-wide Internet.

Relative to present-day desktop conferencing, there are many networking approaches characterized by varying audio/video (A/V) quality and scalability. In recent years, customers have assumed a wide range of positions in their investments in such technologies. At one end of this range, various types of dedicated analog A/V overlay networks exist that deliver high-quality A/V signals at a low cost. At another end of this range are local area data network technologies such as switched Ethernet and ATM data hubs that function with high-performance desktop computers. These desktop computers and data networking technologies currently support only lower-quality A/V capabilities at a relatively high cost. Despite this drawback, these desktop computers and data networking technologies are believed to be the preferred path for eventually providing high-quality A/V capabilities at a low cost. Other A/V networking solutions, such as ISDN to the desktop, also lie in this range.

Within each of many separate networked A/V technology "islands," various approaches toward providing multimedia applications such as teleconferencing, video mail, video broadcast, video conference recording, video-on-demand, video attachments to documents and/or web pages, and other applications can be performed only in fragmented ways with limited interworking capability. For many years, it has been projected that the desktop computer industry and the data networking industry will solve such fragmentation and interworking problems, and eventually create a unified, low-cost solution. Several generations of these technologies and products have consistently fallen short of satisfying this long-felt need. Furthermore, it is likely to be disadvantageous to continue to rely upon the aforementioned industries to satisfy such needs. For example, if the introduction of today's standardized multi-method fax technology had been held back by those who maintain that the idea that all electronic text should only be computer ASCII (as advocated, for example, by M.I.T. Media Lab Director Negroponte), a great amount of the fax-leveraged domestic and international commerce that has occurred since the early 1980's may not have occurred. Desktop multimedia technologies and products are currently in an analogous position, as it is commonly accepted that it will be only the desktop computer and data networking industries that at some point in the future will make high-quality networked A/V widely and uniformly available, and at the same time it is doubtful that this will occur any time soon.

What is sorely needed, given the pace and market strategies of the desktop computer and data networking industries, is an integration of separate technology and application islands into a single low-cost, manufacturable, reliable real-time multimedia collaboration apparatus capable of supporting a wide range of A/V networking technologies; A/V applications; and A/V and data networking configurations in a wide variety of practical environments. A need also exists for a design or architecture that makes such an apparatus readily adaptable to future technological evolution, such that the apparatus may accommodate evolving or new families of interrelated standards.

2. SUMMARY OF THE INVENTION

This invention relates to a multimedia device for use in multimedia collaboration apparatus and systems. Such apparatus and systems also typically contain processing units, audio reception and transmission capabilities, as well as video reception and transmission capabilities. The reception and transmission capabilities allow analog audio/video signal transfer over UTP wires for audio transmit/receive. Further included in these capabilities is audio/video signal transfer via encoding both audio and video signals on a single set of UTP wires, for example, through frequency modulation (FM). The video reception capabilities may include support for a primary digital video stream and an auxiliary digital video stream. The reception, transmission, encoding, and decoding capabilities could exist in a single packaging. This or another single packaging can support a plurality of multimedia network signal formats, including analog plus digital or all digital. Different wire pair combinations could also be supported, such as 10 and 100 Megabit-per-second (MBPS) Ethernet, as well as Gigabit Ethernet, via Unshielded Twisted Pair (UTP) wiring. Other embodiments could include support for other or additional networking protocols, such as Asynchronous Transfer Mode (ATM) networking. AV reception capabilities include adaptive stereo echo-canceling capabilities and synthetic aperture microphone capabilities.

In addition, this invention may include a single packaging allowing for stereo echo-canceling capabilities. The invention also includes synthetic aperture microphone capabilities, such as capabilities for programmably adjusting a position of a spatial region corresponding to maximum microphone audio sensitivity. The synthetic aperture microphone capabilities typically are implemented through an audio signal processing unit and a plurality of microphones.

This system further embodies multiport networking capabilities in which a first port couples to a multimedia network which can carry multimedia signals in multiple format, and a second port couples to a set of computers. These multiport networking capabilities also include data packet destination routing.

Moreover, the invention includes a memory in which an operating system and application software having internet browsing capabilities resides. A graphical user interface is included in the invention with I/O capabilities that support graphical manipulation of a cursor and pointing icon.

The multimedia apparatus also includes a display device having integrated image capture capabilities. Typically, the display device is a single substrate upon which display elements and photosensor elements reside. The display device has display elements interleaved with a plurality of photosensor elements in a planar arrangement. Further, the display elements may be integrated with the photosensor elements. The display elements are typically optically semitransparent.

Photosensor elements typically occupy a smaller area than the display elements and are fabricated with different geometries such that the nonluminent spacing between display elements is reduced. Also, the photosensor elements and sets of display elements are fabricated with optical structures to minimize perceived areas of nonluminescence between a set of displayed pixels.

Among other characteristics of the photosensor elements are: (1) a plurality of photosensor elements in the display device are individually-apertured, and (2) a set of photosensor elements in the display device includes dedicated microoptic structures. Also, image processing capabilities are coupled to the photosensor elements in the display device.

The display device can operate to display an image on a screen while capturing external image signals. This is done by outputting display signals to a set of display elements while capturing external image signals using a set of photosensor elements. These sets of display and photosensor elements occupy different lateral regions across the plane of the display device. The first set of display elements comprises at least one display line across the screen, and the first set of photosensor elements comprises a photosensor line across the screen. Display lines and photosensor lines may be scanned in a temporally or spatially separate manner.

The device performs a set of optical image processing operations by receiving external image signals through a set of apertures or a set of microoptic elements. The device then outputs an electrical signal at each photosensor element within a set of photosensor elements corresponding to the set of apertures. These electrical signals have magnitudes dependent upon the light intensity detected by the photosensor elements.

3. BRIEF DESCRIPTION OF THE DRAWINGS

FIG. 17 is an illustration of an exemplary photosensor element color and display element color distribution scheme.

4. DETAILED DESCRIPTION

4.1 General Provisions

Figure 1:
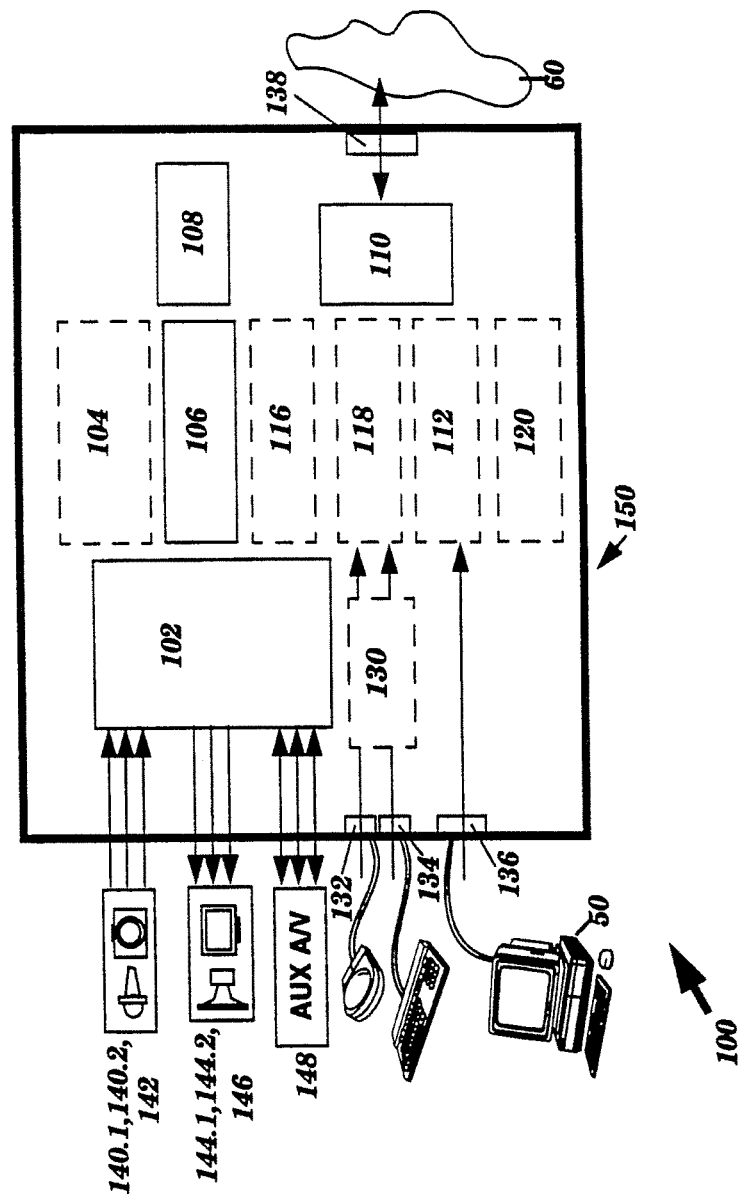
FIG. 1 is a high-level block diagram of a multimedia collaboration device constructed in accordance with the present invention.

The present invention comprises a device that provides analog audio/video and/or digital audio/visual (both referred to herein as A/V) multimedia collaboration capabilities to a user coupled to a multimedia network, such as a Multimedia Local Area Network (MLA/V) as described in U.S. Pat. No. 5,617,539 the disclosure of which is incorporated herein by reference.

The present invention may operate either in conjunction with one or more user's computers or in a stand-alone manner, and may support two-way videoconferencing, two-way message publishing, one-way broadcast transmission or reception, one-way media-on-demand applications, as well as other audio, video, and/or multimedia functionality or operations. The present invention may support such multimedia functionality across a wide range of multimedia network implementations, including mixed analog and digital and/or all-digital multimedia networks. When used in conjunction with a companion computer (i.e., desktop, laptop, special-purpose workstation or other type of computer), the present invention may operate as a high-performance multimedia processing device that offloads potentially computation-intensive multimedia processing tasks from the companion computer.

The present invention unifies several previously segregated or disparate audio-, video-, and/or multimedia-related technologies in a single physical device that supports multiple multimedia applications and multiple network signal formats and standards. Such technologies may include hardware and/or software that provide audio signal processing, analog-to-digital (A-D) and digital-to-analog (D-A) conversion, compression and decompression, signal routing, signal level control, video conferencing, stored video-on-demand, internet browsing, message publishing, and data networking capabilities. Heretofore, these technologies were typically implemented via separate devices and/or systems that may have operated in accordance with different data or signal formats and/or standards, and that offered limited ability (if any) to interface or operate together.

In particular, the multimedia collaboration device described herein supports functionality that may include the following:

1. Audio signal handling:
    a) stereo speakers—to provide realistic audio reproduction capabilities needed for multimedia presentations, music, and multiport teleconferencing, including support for three-dimensional sound and audio positioning metaphors;
    b) adaptive echo-canceled stereo speakers for the environment and mono or stereo microphone—to provide high-quality, realistic audio interactions and eliminate echo and/or feedback in conferencing situations; and
    c) adaptive echo-canceled mono synthetic aperture microphone—to significantly improve audio capture performance in noise-prone or poorly-controlled audio environments, such as office cubicles or public kiosks.
2. One or more data networking protocols, where such protocols may span a range of technological generations. In one embodiment, the present invention includes built-in support for 10 and 100 Megabit-per-second (MBPS) Ethernet, as well as Gigabit Ethernet, via Unshielded Twisted Pair (UTP) wiring. Other embodiments could include support for other or additional networking protocols, such as Asynchronous Transfer Mode (ATM) networking and Integrated Services Digital Network (ISDN).
3. One or more analog A/V signal transmission/reception formats, where such formats may span various means of:
    a) Analog A/V signal transfer via a separate pair of wires for each of audio transmit, audio receive, video transmit, and video receive (i.e., a total of four sets of UTP wires);
    b) Analog A/V signal transfer via a single set of UTP wires for audio/video transmit, plus a single set of UTP wires for audio/video receive (i.e., a total of two twisted-pairs carrying analog A/V signals), through frequency modulation (FM) or other multiplexing techniques;
    c) Analog A/V signal transfer via encoding both audio and video signals on a single set of UTP wires, for example, through FM or other multiplexing methods and perhaps 2-wire/4-wire electronic hybrids; and
    d) Any of the above approaches that carry the analog A/V signals on the same wire pairs as used by data networking circuits (through the use of FM or other modulation techniques).

Either of the above analog A/V signal transfer formats allow the use of a single conventional data network connector for carrying both analog A/V and data networking signals. For example, a standard 8-wire RJ-45 connector can support 10 and/or 100 MBPS Ethernet in conjunction with analog A/V signal transfer, using two twisted pairs for Ethernet networking and two twisted pairs for A/V signal transfer. In the event that data networking is implemented via a protocol for which a sufficient number of connector pins or wires are unavailable for A/V signal transfer, such as Gigabit Ethernet, which conventionally utilizes the entire physical capacity of an RJ-45 connector, the present invention may include an additional connector or coupling for analog A/V signal transfer.
4. Digital multimedia streaming I/O, transmitted to and/or received from a multimedia network and/or a companion computer, as further described below.
5. Internal A/V signal encoding and decoding capabilities to support A/V compression formats such as MPEG 1/2/4, JPEG, H.310, H.320, H.323, QuickTime, etc.
6. Internal data routing capabilities, through which data packets, cells, or streams may be selectively transferred among a multimedia network, the present invention, and/or a set of companion computers.
7. Multimedia call and connection control protocols, such as described in U.S. Pat. No. 5,617,539.

8. Internet browsing and multimedia internet message transfer capabilities.
9. Data sharing and/or application sharing protocols.
10. Network configuration and/or network traffic monitoring capabilities.

Through the combination of the data routing, internal encoding/decoding, and/or digital streaming capabilities, the present invention may operate as a multimedia processing device that offloads potentially computationally-intensive multimedia processing tasks from a companion computer. Use of the present invention to reduce a companion computer's processing burden can be particularly advantageous in real-time multimedia situations. The present invention may further provide an older or outdated computer with comprehensive real-time multimedia collaboration capabilities, as described below. Additionally, the present invention may operate as a stand-alone device, such as a self-contained internet or intranet appliance having real-time multimedia capabilities, and/or an ISDN video teleconferencing terminal.

The present invention also may advantageously incorporate new technologies, including an integrated camera/display device as described in detail below. Furthermore, the present invention provides support for technology and standards evolution by 1) facilitating the use of standard plug-in and/or replaceable components, which may be upgraded or replaced over time; 2) providing designed-in support for recently-developed technologies that are likely to gain widespread use, such as switched 10 MBPS full-duplex internet, 100 MBPS switched Ethernet, ATM, or Gigabit Ethernet (as well as interim-value networks such as ISDN); and 3) providing for upgradability via software and/or firmware downloads. The present invention may additionally implement particular capabilities via reconfigurable or reprogrammable logic devices, such as Field Programmable Gate Arrays (FPGAs). Updated configuration bitstreams can be downloaded into these reconfigurable devices to provide hardware having upgraded or new capabilities.

4.2 High-Level Architecture and Packaging Options

FIG. 1 is a high-level block diagram of a multimedia collaboration device 100 constructed in accordance with the present invention. The multimedia collaboration device 100 comprises a preamplifier and buffer unit 102; an audio signal conditioning unit 104; a switching unit 106; an Unshielded Twisted Pair (UTP) transceiver 108; a pair splitter 110; a routing unit 112; an encoding/decoding unit 116; a processor set 118; a memory 120; an input device interface 130; a companion computer port 136; and a building or premises network port 138.

The premises network port 138 facilitates coupling to premises- or building-based UTP wiring that forms a portion of a multimedia network 60. In one embodiment, the premises network port 138 comprises a conventional network coupling, such as an RJ-45 connector. The companion computer port 136 facilitates coupling to one or more host or companion computers 50, such that the present invention can offload real-time multimedia processing tasks from a companion computer 50 and/or provide a pass-through for data packet exchange between a host computer 50 and the multimedia network 60. In one embodiment, the companion computer port 136 comprises a conventional network coupling that is compatible with the premises network port 138. In another embodiment, the premises network port 138 may employ a more sophisticated or modern protocol than that used by the companion computer port 136. In yet another embodiment, a host or companion computer may access the multimedia collaboration device 100 via the premises network port 138, and hence such an embodiment may not include a separate companion computer port 136. It is also possible for the present invention to communicate with a host or companion computer 50 over the data networking ports 136, 138 for use in running Graphical User Interfaces (GUIs) or coordinating with application processes executing on the host or companion computer 50.

The preamplifier and buffer unit 102 receives A/V signals from a left and a right microphone 140.1, 140.2 and a camera 142, and transmits A/V signals to a left and a right speaker 144.1, 144.2 and a display device 146. The preamplifier and buffer unit 102 can additionally send and receive A/V signals via a set of auxiliary (AUX) A/V ports 148, which could couple to a device such as a Video Cassette Recorder (VCR).

As elaborated upon below, the audio signal conditioning unit 104 provides volume control functionality in conjunction with echo-canceled stereo microphone or mono synthetic aperture microphone capabilities. In one embodiment, the echo-canceled stereo microphone and mono synthetic aperture microphone capabilities may be implemented in a single mode-controlled Digital Signal Processor (DSP) chip, in a manner that may facilitate user-selectivity between these two types of microphone functionality. If the microphone array 140.1, 140.2 includes more than two microphones, it may be desirable to employ DSP techniques to synthesize a stereo synthetic aperture microphone. Further multiple microphone processing modes, such as stochastic noise suppression for extreme noise environments, can also be included.

In the present invention, transfer of incoming and/or outgoing A/V signals between a variety of sources and/or destinations is required, including the microphones 140.1, 140.2, the camera 142, the speakers 144.1, 144.2, the display device 146, other A/V or I/O devices, the premises network port 138, and/or the companion computer port 136. Signal transfer pathways for such sources and destinations may ultimately be analog or digital in nature. To meet these switching needs, the multimedia collaboration device employs the switching unit 106, which selectively routes analog A/V signals associated with the microphones 140.1, 140.2, the camera 142, the speakers 144.1, 144.2, the display device 146, and/or other devices to or from the analog A/V UTP transceiver 108 and/or the encoding/decoding unit 116. The encoding/decoding unit 116 may also perform any required conversion between analog and digital formats.

As further described below, the analog A/V UTP transceiver 108 provides an analog signal interface to the pair splitter 110, which separates data networking and analog A/V signals. In many cases this signal separation is most easily accomplished by selectively separating wires or wire pairs, but may also include the use of passive (or equivalent) wire switching arrangements and programmable Frequency Division Multiplexing (FDM) modulators and demodulators. As indicated earlier, the encoding/decoding unit 116 performs conversions between analog and digital signal formats, and as such also compresses and decompresses A/V signals. Although not shown, those skilled in the art will understand that an ISDN transceiver, inverse multiplexer, network connector, Q.931 call control, etc. . . . can be introduced into the architecture to add support for ISDN. The processor set 118 controls the operation of the multimedia collaboration device 100, and performs data network communication operations. In conjunction with operating system and other software resident within the memory 120, the processor set 118 may provide graphic overlay capabilities on a video image so as to implement any GUI capabilities. These GUIs may facilitate control over the operations of the present invention, and may further provide internet browsing capabilities, as described in detail below. The routing unit 112 performs network packet exchange operations between the premises network port 138, the companion computer port 136, and the processing unit 118, where such packets may include data, portions of, or entire digital A/V streams, and/or network configuration or traffic monitoring information. Finally, the input device interface 130 may provide auxiliary mouse and keyboard ports 132, 134, and may also support an internal local geometric pointing input device as described below.

Particular groupings of the aforementioned elements may be packaged in various manners so as to match particular deployment settings. For example, selected element groupings may reside within or upon a peripheral box package, computer-bus-compatible card, or housing 150, where such element groupings may include various A/V transducers. The nature of the selected package 150, and the manner in which the aforementioned elements are incorporated therein or thereupon as integrated, modular, plug-in, and/or other types of components, is dependent upon the manner in which the present invention is employed, and may be subject to or adaptive to evolving market forces and embedded legacy equipment investments. Three exemplary types of packages are described in detail hereafter.

Figure 2:
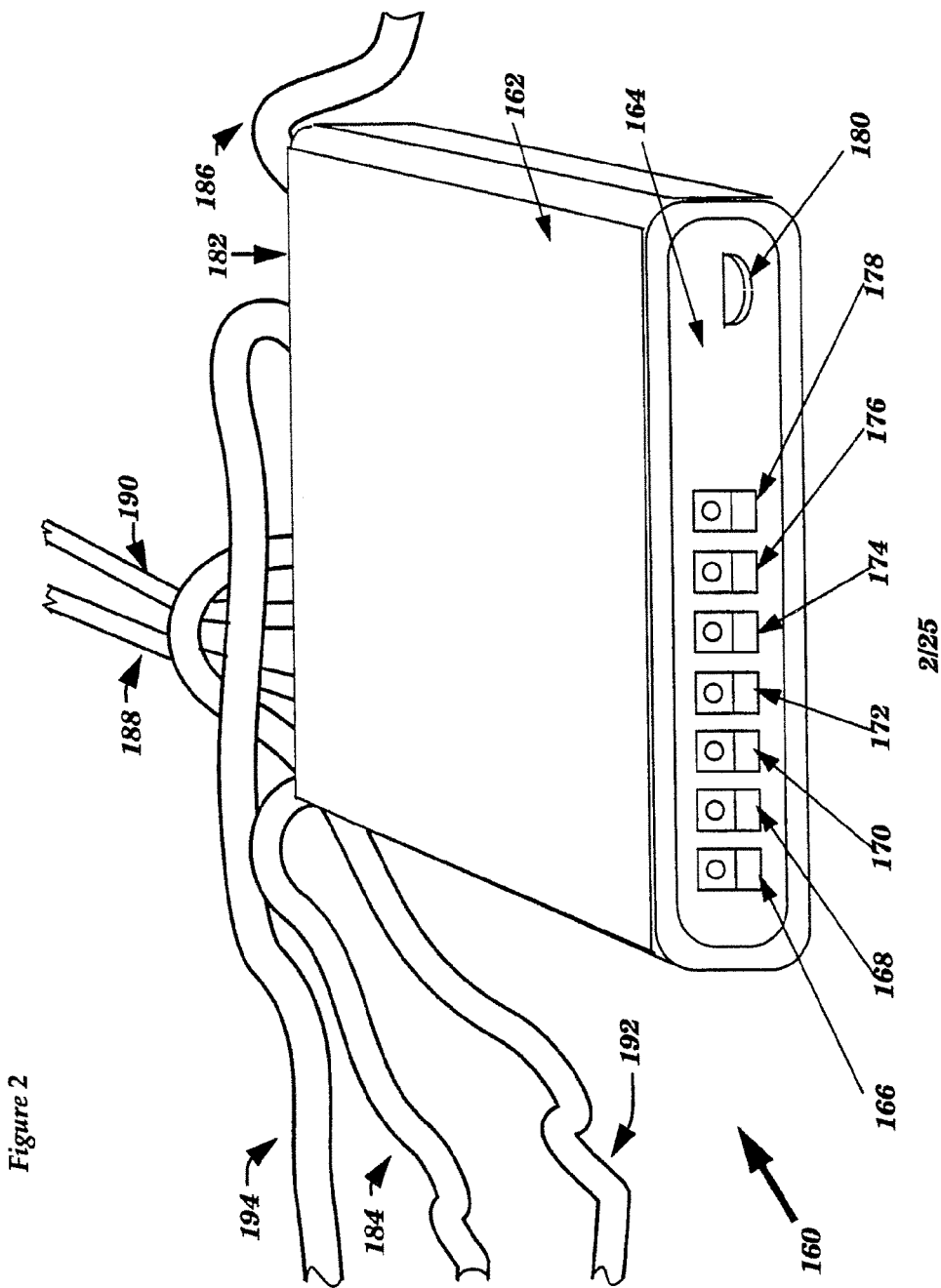
FIG. 2 is a high-level perspective view illustrating a box package for the multimedia collaboration device.

FIG. 2 is a high-level perspective view illustrating a box package 160 for the multimedia collaboration device 100. This illustrative box package 160 comprises a housing 162 having a control panel 164 and a cable panel 182. The control panel 164 includes an audio mode control 166; a microphone/speaker/headset selector 168; a microphone mute control 170; a hold/resume control 172; AUX video and audio inputs 174, 176; a telephone add/remove control 178; and a speaker/earphone volume control 180. The audio mode control 166 facilitates user-selection between stereo microphone and synthetic aperture microphone operation, as further described below. The microphone/speaker/headset selector 168 provides for user-selection of different audio input/output interfaces, and the microphone mute control 170 facilitates user control over audio input muting. The hold/resume control 172 pauses or resumes audio inputs in response to user-selection. The AUX video and audio inputs 174, 176 respectively facilitate video and audio input from various sources. The telephone add/remove control 178 provides control of the insertion of an optional bridge or coupling to a telephone line for two-way audio contact with an addition of third-party telephone user. The supporting electrical couplings would provide for standard telephone loop-through. In one embodiment, the telephone add/remove control 178 includes conventional telephone line echo cancellation circuitry to remove the undesired transmit/receive coupling effects introduced by telephone loops. Finally, the speaker/earphone volume control 180 controls the amplitude of an audio signal delivered to speakers or an earphone (in accordance with the setting of the microphone/speaker/headset selector 168). Some implementations may include separate volume controls for speakers, earphones, and/or auxiliary audio I/O.

The cable panel 182 on the box package 160 includes inputs and outputs that facilitate coupling to a camera/microphone cable 184; a premises UTP cable 186; left and right speaker cables 188, 190; a video monitor or video overlay card cable 192; and a UTP computer networking cable 194.

The box package 160 is suitable for use with a companion desktop or portable computer, and could reside, for example, underneath, atop, or adjacent to a computer or video monitor. Furthermore, a single box package 160 may be used to provide a plurality of companion computers 50 with multimedia collaboration capabilities, for example, in a small office environment.

Those skilled in the art will understand that the above combination of features is illustrative and can be readily altered. Those skilled in the art will also understand that in an alternate embodiment, the box package 160 could include a built-in microphone or microphone array, as well as one or more speakers. Furthermore, those skilled in the art will understand that one or more controls described above could be implemented via software.

Figure 3:
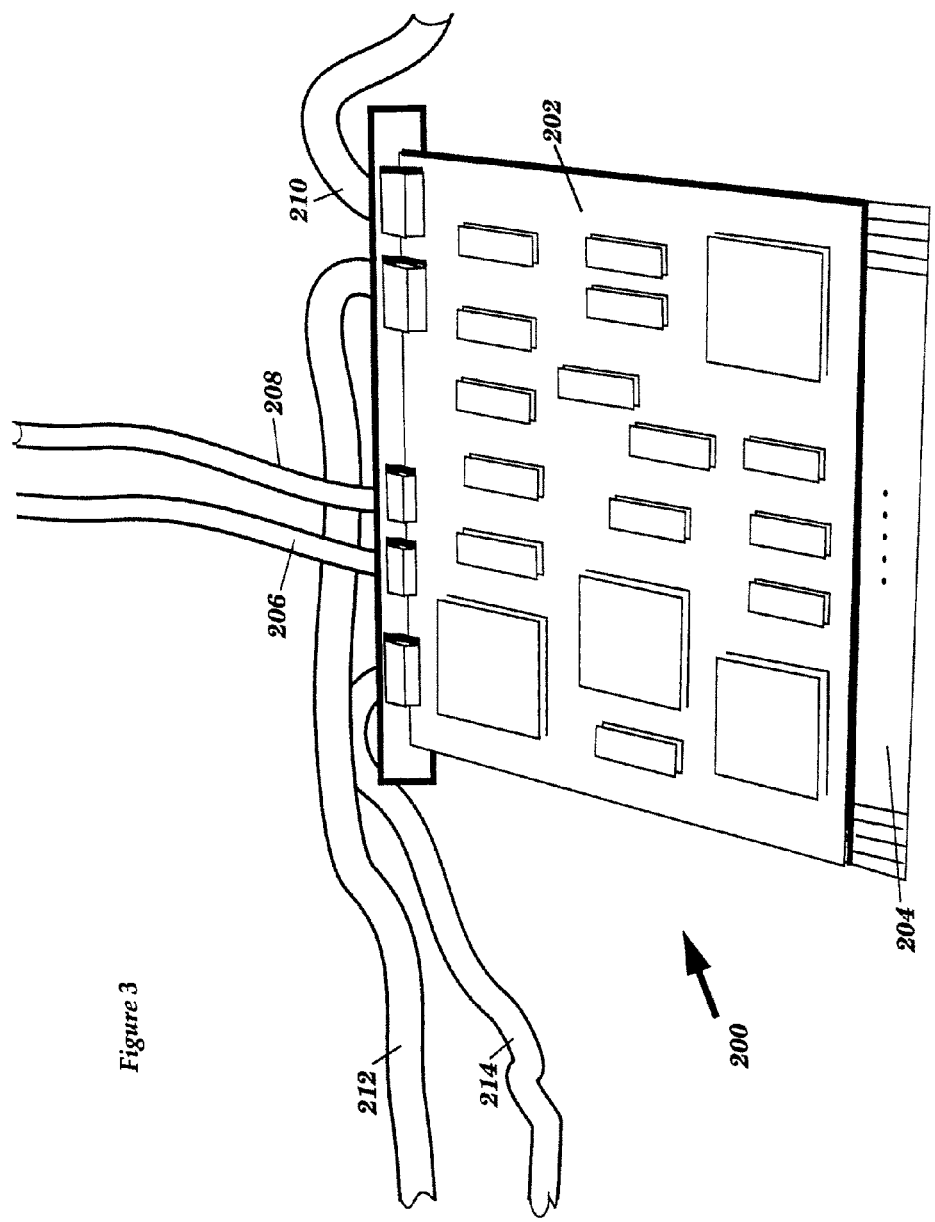
FIG. 3 is a high-level drawing of a plug-in card package for the multimedia collaboration device, which also includes a bus interface.

FIG. 3 is a suggestive high-level drawing showing the format of a plug-in card package 200 for the multimedia collaboration device 100. The plug-in card package 200 comprises a circuit board or card 202 having a standard interface 204 that facilitates insertion into an available slot within a computer. For example, the standard interface 204 could comprise plated connectors that form a male Peripheral Component Interface (PCI) connector, for insertion into a female PCI slot coupled to a PCI bus. The elements comprising the multimedia collaboration device 100 may be disposed upon the card 202 in the form of discrete circuitry, chips, chipsets, and/or multichip modules. The card 202 includes inputs and outputs for coupling to a camera/microphone cable 214; left and right speaker cables 206, 208; a premises UTP cable 210; and a UTP-to-computer cable 212 that facilitates pass-through of data networking signals to an existing data networking card. It is understood that conventional PCI bus interface electronics and firmware may be added to this configuration. Alternatively, the PCI bus may simply be used to provide power and electrical reference grounding.

The multimedia collaboration device 100 may include more extensive data networking capabilities, capable in fact of supporting essentially all the networking needs of one or more companion or host computers, as described in detail below. In this variation, the plug-in card package 200 may therefore be used to provide a computer into which it is inserted with complete data networking capabilities in addition to multimedia collaboration capabilities via transfer of data networking packets between the interface 204 and the computer, in which case the UTP-to-computer cable 212 may not be necessary. The presence of the plug-in-card package 200 may therefore obviate the need for a separate network interface card (NIC) in market situations in which sufficient evolution stability in data networking technologies exists.

The plug-in card package 200 may be used to provide older or less-capable computers with comprehensive, up-to-date real-time multimedia collaboration capabilities. Alternatively, the plug-in card package 200 can provide video overlay multimedia capabilities to computer systems having a monitor for which a video overlay card is unavailable or difficult to obtain. In the event that video overlay multimedia capabilities are to be delivered to a display or video monitor other than that utilized by the companion computer 50, the plug-in card package 200 may include a port that facilitates coupling of a video monitor or video overlay card cable 192 in a manner analogous to that shown in FIG. 2. A host computer 50 that incorporates a plurality of plug-in card packages 200 could be used as a multimedia collaboration server for other computers, in a manner understood by those skilled in the art.

Those skilled in the art will additionally understand that one or more of the physical panel controls described above with reference to the box package 160 would be implemented via software control for the plug-in card package 200.

Figure 4:
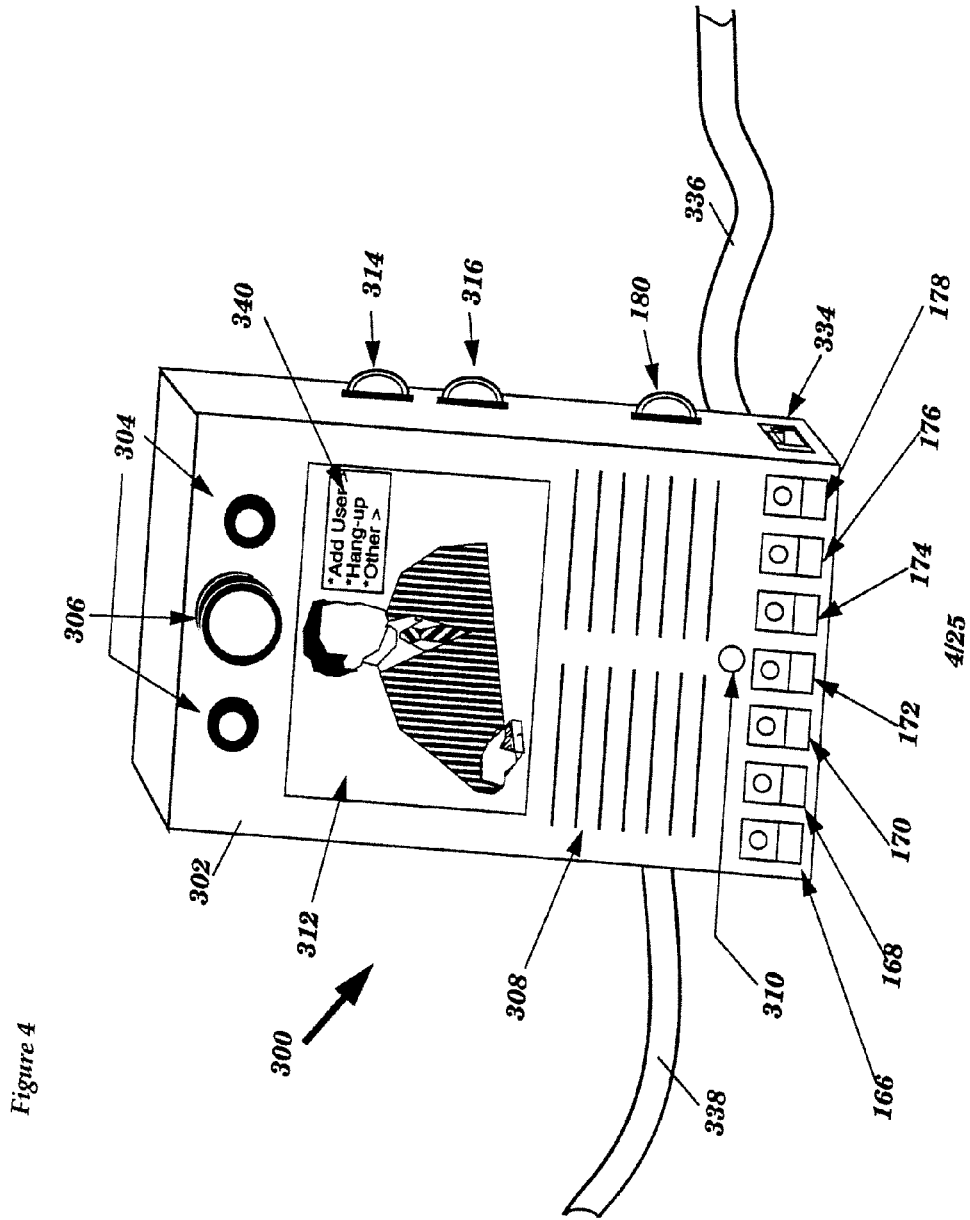
FIG. 4 is a perspective view of a stand-alone package for the multimedia collaboration device, which includes a camera, a display, a microphone array, and speakers.

FIG. 4 is a perspective view of a stand-alone package 300 for the multimedia collaboration device 100 that includes a range of advantageous internal A/V transducer configurations. In one deployment, the stand-alone package may be attached, mounted, or placed proximate to the side of a computer monitor or laptop/palmtop computer, and hence is referred to herein as a "side-kick" package 300.

The side-kick package 300 provides users with a self-contained highly-localized multimedia communication interface. The incorporation of the microphone array 304 into the side-kick package 300 assists in controlling the present invention's superior audio performance relative to adaptive echo-canceled stereo microphone and adaptive echo-canceled mono synthetic aperture microphone capabilities described below. The placement of the camera 306 in close proximity to the flat display device 312 aids in maintaining good user eye contact with a displayed image, which in turn better simulates natural person-to-person interactions during videoconferencing. The eye contact can be further improved, and manufacturing further simplified, by an integrated camera/display device as described below with reference to FIGS. 16 through 25.

The side-kick package 300 can be used in conjunction with a companion computer 50, or in a stand-alone manner. When used with a companion computer 50, the side-kick package 300 eliminates the need to consume companion computer screen space with a video window. As a stand-alone device, the side-kick package 300 can be used, for example, in office reception areas; public kiosks; outside doorways; or alongside special-purpose equipment for which explicatory, possibly interactive assistance may be useful, such as a photocopier.

Relative to FIG. 2, like reference numbers designate like elements. The side-kick package 300 comprises a housing 302 in which the multimedia collaboration device 100 described above plus additional elements such as an internal shock-mounted microphone array 304; a camera 306 that may include auto-focus, auto-iris, and/or electronic-zoom features; acoustically-isolated stereo speakers 308; a thumb-stick mouse or similar type of geometric input device 310; and a flat display device 312 may reside. The side-kick package 300 may further include display brightness and contrast controls 314, 316, and/or one or more auxiliary audio level controls 180. Additionally, the side-kick package 300 may include a control panel having physical panel controls such as an audio mode control 166; a microphone/speaker/headphone selector 168; a microphone mute control 170; a hold/resume control 172; AUX video and audio inputs 174, 176; and a telephone add/remove control 178, which function in the manner previously described. Those skilled in the art will understand that the functions of one or more of the physical controls shown in FIG. 4 could be implemented so as to be controlled remotely via software. In some arrangements, there might not be any physical controls, in which case control is facilitated by GUIs executing on one or more companion computers 50. Ideally, this embodiment may include both physical and remote software controls so that it can operate as a fully stand-alone device as well as a slave device supporting applications running on the companion computer 50.

The side-kick package 300 has ports for coupling to a premises UTP cable 336 and an optional UTP-to-computer cable 338. The side-kick package 300 may also include another connector set 334, which, for example, facilitates coupling to a headset, an auxiliary mouse, and/or an auxiliary keyboard. FIG. 4 additionally depicts an overlay window 340 upon the flat display device 312, which may be realized via graphics overlay capabilities. The graphics overlay capabilities can implement menus or windows 340 that can provide a user with information such as text or graphics and which may be selectable via the input device 310, creating internal stand-alone GUI capabilities.

Relative to each package 160, 200, 300 described herein, use of the multimedia collaboration device 100 with one or more companion computers 50 to effect digital networked A/V communication advantageously spares each companion computer 50 the immense computational and networking burdens associated with transceiving and encoding/decoding A/V streams associated with A/V capture and presentation. The invention may also incorporate additional video graphics features in any of the packages 160, 200, 300 described above, such as telepointing over live video and/or video frame grab for transference to or from a companion or host computer 50.

Figure 5:
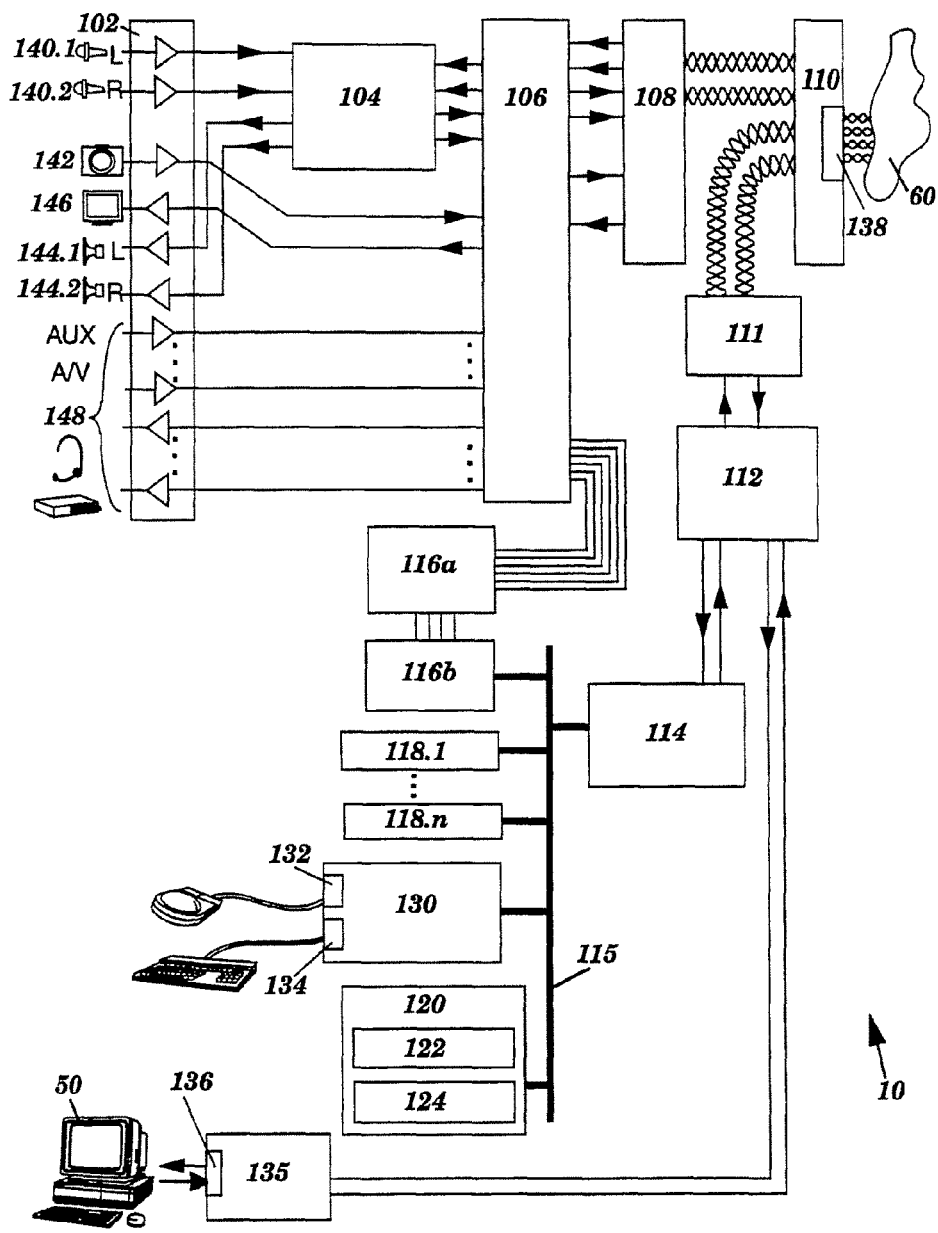
FIG. 5 is a block diagram of a first embodiment of a multimedia collaboration device constructed in accordance with the present invention, and which provides primary and auxiliary (AUX) support for analog audio/video (A/V) input/output (I/O), and further provides support for networked digital streaming.
Figure 6:
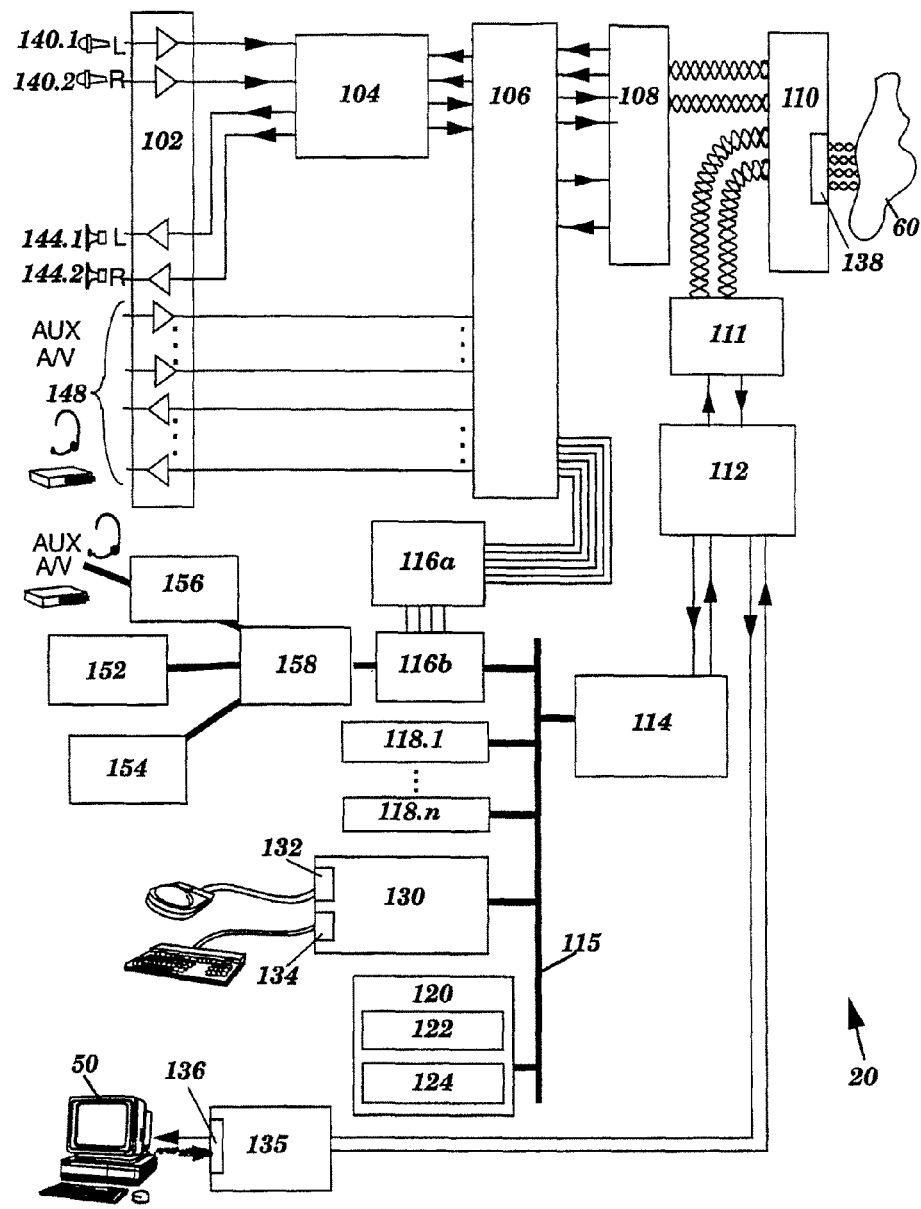
FIG. 6 is a block diagram of a second embodiment of a multimedia collaboration device, which provides primary support for analog audio I/O and digital visual I/O, and further supports analog and digital auxiliary A/V I/O, plus networked digital streaming.
Figure 7:
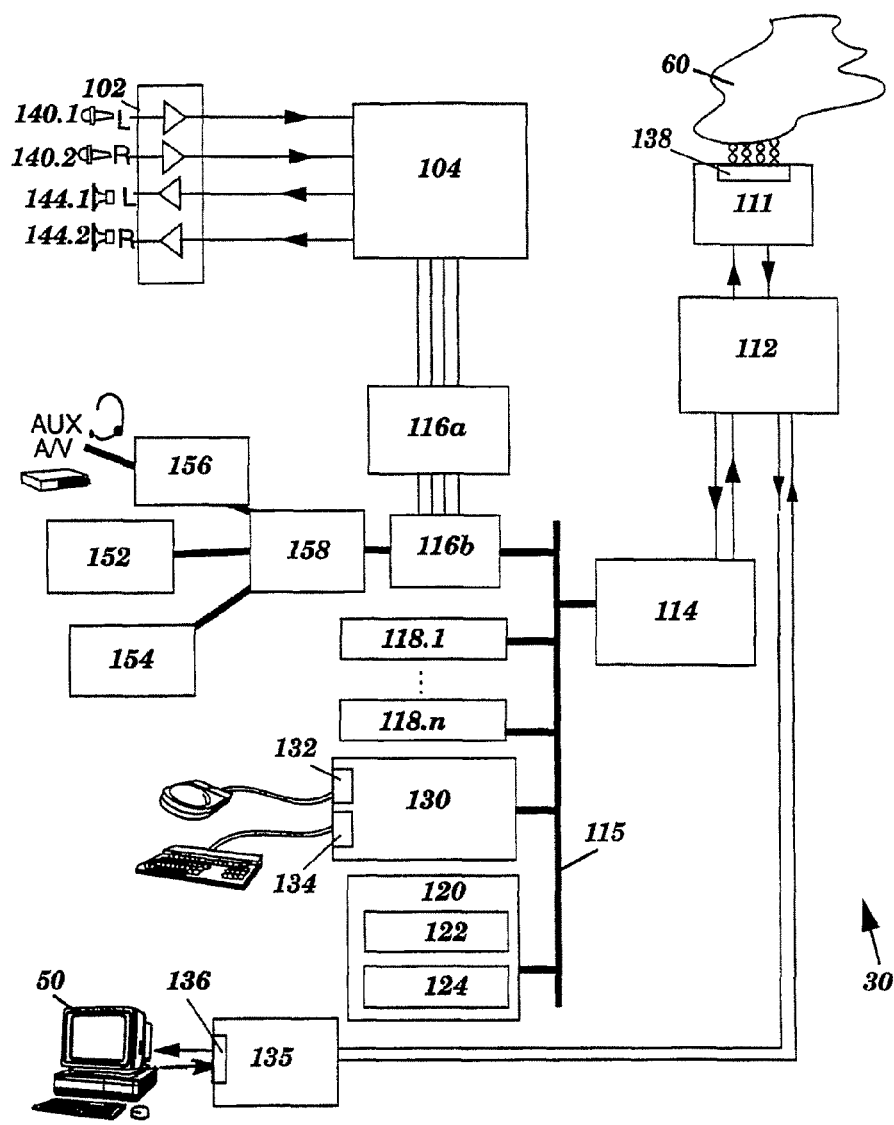
FIG. 7 is a block diagram of a third embodiment of a multimedia collaboration device, which provides primary support for analog audio I/O and digital visual I/O, support for digital auxiliary A/V I/O, and support for networked digital streaming.

While FIG. 1 provides a broad overview of the architecture of the present invention, specific architectural details and various embodiments are elaborated upon hereafter, particularly with reference to FIGS. 5, 6, and 7.

4.3 Architectural Details

FIG. 5 is a block diagram of a first embodiment of a multimedia collaboration device 10 constructed in accordance with the present invention, and which provides primary and auxiliary (AUX) support for analog A/V, and further provides support for networked digital streaming. With reference to FIG. 1, like reference numbers designate like elements. The embodiment shown in FIG. 5 supports analog A/V, and comprises the preamplifier and buffer unit 102; the audio signal conditioning unit 104; the A/V switch 106; the analog A/V UTP transceiver 108; the pair splitter 110; a first and a second digital transceiver 111, 135; the routing unit 112; a network interface unit 114; an analog-to-digital (A/D) and digital-to-analog (D/A) converter 116a; an A/V compression/decompression (codec) unit 116b; at least one, and possibly multiple, processors 118.1, 118.n; the memory 120; the I/O interface 130; and the companion and premises network ports 136, 138. An internal bus 115 couples the network interface unit 114, the A/V codec 116b, each processor 118.1, 118.n, the memory 120, and the I/O interface 130. Each of the audio signal conditioning unit 104, the A/V switch 106, the analog A/V UTP transceiver 108, the routing unit 112, and the A/D-D/A converter 116a may also be coupled to the internal bus 115, such that they may receive control signals from the processors 118.1, 118.n.

The preamplifier and buffer unit 102 is coupled to receive left and right microphone signals from a left and right microphone 140.1, 140.2, respectively; and a camera signal from the camera 142. It is understood that additional microphones 140.3 . . . 140.x and processing 118 and/or switching capabilities 106 may be included to enhance the synthetic aperture microphone capabilities described below. The preamplifier and buffer unit 102 may further receive AUX A/V input signals from one or more auxiliary A/V input devices such as an external VCR, camcorder, or other device. The preamplifier and buffer unit 102 respectively outputs left and right speaker signals to a left and a right speaker 144.1, 144.2; and a display signal to the display device 146. The preamplifier and buffer unit 102 may also deliver AUX A/V output signals to one or more auxiliary devices.

Figure 8:
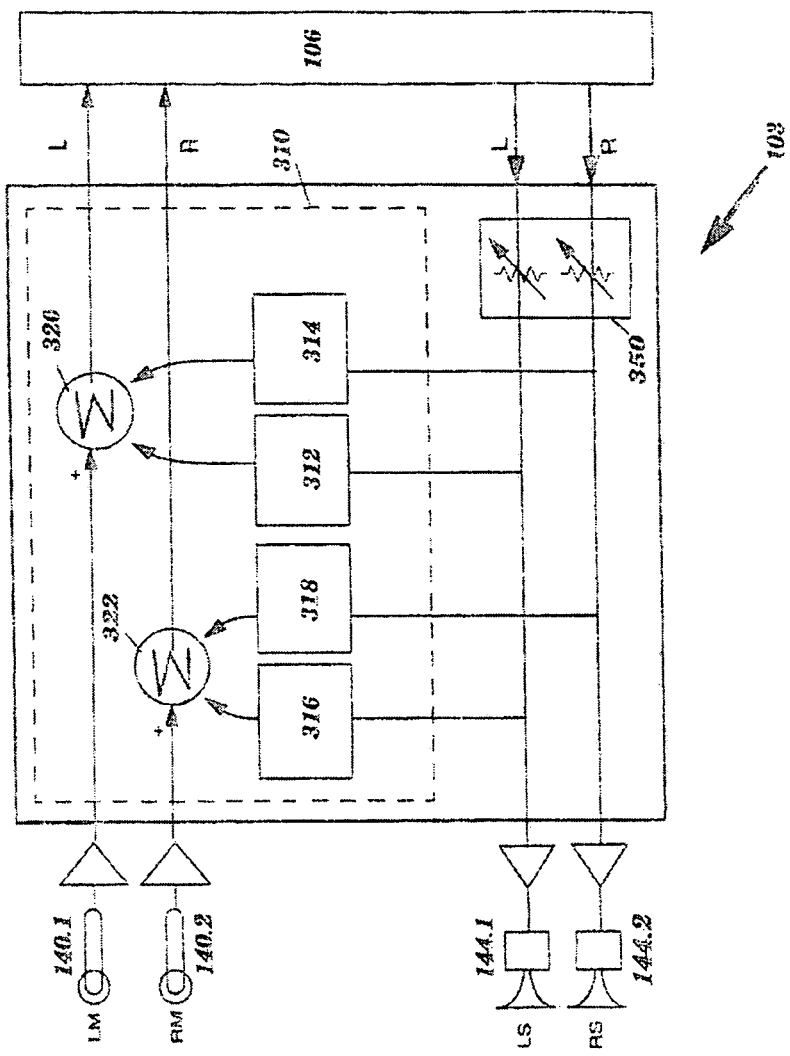
FIG. 8 is a block diagram of an adaptive echo-canceled stereo microphone and stereo speaker arrangement within an audio signal conditioning unit of the present invention.

The audio signal conditioning unit 104 facilitates the adjustment of outgoing audio signal volume in conjunction with providing adaptive echo cancelled stereo microphone or mono synthetic aperture microphone processing operations upon audio signals received from the preamplifier and buffer unit 102. FIG. 8 is a block diagram of an adaptive echo-canceled stereo microphone unit 103 within the audio signal conditioning unit 104. The adaptive echo-canceled stereo microphone unit 103 comprises a stereo echo canceller 310 and a stereo volume control unit 350.

The stereo echo canceller 310 comprises conventional monoaural echo canceller subsystems that function in a straightforward manner readily apparent to those skilled in the art. This arrangement includes a left microphone/left speaker (LM/LS) adaptive acoustic echo filter model 312; a left microphone/right speaker (LM/RS) adaptive acoustic echo filter model 314; a right microphone/left speaker (RM/LS) adaptive acoustic echo filter model 316; and a right microphone/right speaker (RM/RS) adaptive acoustic echo filter model 318. It will be readily understood by those skilled in the art that linear superposition results in stereo echo canceling capabilities for stereo microphones and stereo speakers.

The stereo volume control unit 350 is coupled to a volume adjustment control such as described above with reference to the various package embodiments 160, 200, 300 shown in FIGS. 2, 3, and 4, and is further coupled to receive the left and right speaker signals. The stereo volume control unit 350 is also coupled to each model 312, 314, 316, 318 in order to maximize the utilization of DSP arithmetic and dynamic range throughout the full range of speaker volume settings. It is understood that stereo balance controls can be implemented using the same stereo volume control elements operating in complimentary increments.

The LM/LS and LM/RS models 312, 314 are coupled to receive the left and right speaker signals, respectively. Similarly, the RM/LS and RM/RS models 316, 318 are respectively coupled to receive the left and right speaker signals 300. Each of the LM/LS, LM/RS, RM/LS, and RM/RS models 312, 314, 316, 318 incorporates an adaptive coefficient tapped delay line weighting element coupled to its corresponding microphone 140.1, 140.2 and speaker 144.1, 144.2 in a conventional manner. Additionally, the LM/LS and LM/RS models 312, 314 maintain conventional couplings to the left microphone 140.1 to facilitate initial acoustic environment and subsequent adaptive acoustic training operations. Similarly, the RM/LS and RM/RS models 316, 318 maintain couplings to the right microphone 140.2 to facilitate these types of training operations.

The stereo echo canceller 310 additionally includes a first signal summer 320 coupled to outputs of the left microphone 140.1, the LM/LS model 312, and the LM/RS model 314; plus a second signal summer 322 coupled to outputs of the right microphone 140.2, the RM/LS model 316, and the RM/RS model 318. The first signal summer 320 delivers a left echo-canceled signal to the A/V switch 106, and the second signal summer 322 delivers a right echo-canceled signal to the A/V switch 106, in a manner readily understood by those skilled in the art.

In one embodiment, the stereo echo canceller 310 and stereo volume control unit 350 are implemented together via DSP hardware and software. Furthermore, a single DSP may be used to implement the stereo echo canceller 310, the stereo volume control unit 350, and the adaptive echo-canceled mono synthetic aperture microphone unit 105, which is described below. In an exemplary embodiment, such a DSP may comprise a Texas Instruments TMS320C54x generation processor (Texas Instruments Incorporated, Dallas, Tex.).

In the event that a user employs an earphone, headphone set, or AUX audio device in conjunction with the present invention, as described above with reference to the box, card, and side-kick packages 160, 200, 300, the stereo echo canceller 310 is placed in a bypassed, inactive, or quiescent state and the DSP and stereo volume control unit 350 facilitate normalization and/or volume adjustment in a conventional manner as understood by those skilled in the art. Alternatively, separate volume control and/or normalization circuitry could be provided when stereo microphones or the stereo echo canceller 310 is not needed. These may be implemented in various ways with respect to the paths connecting to the A/V switch.

Figure 9:
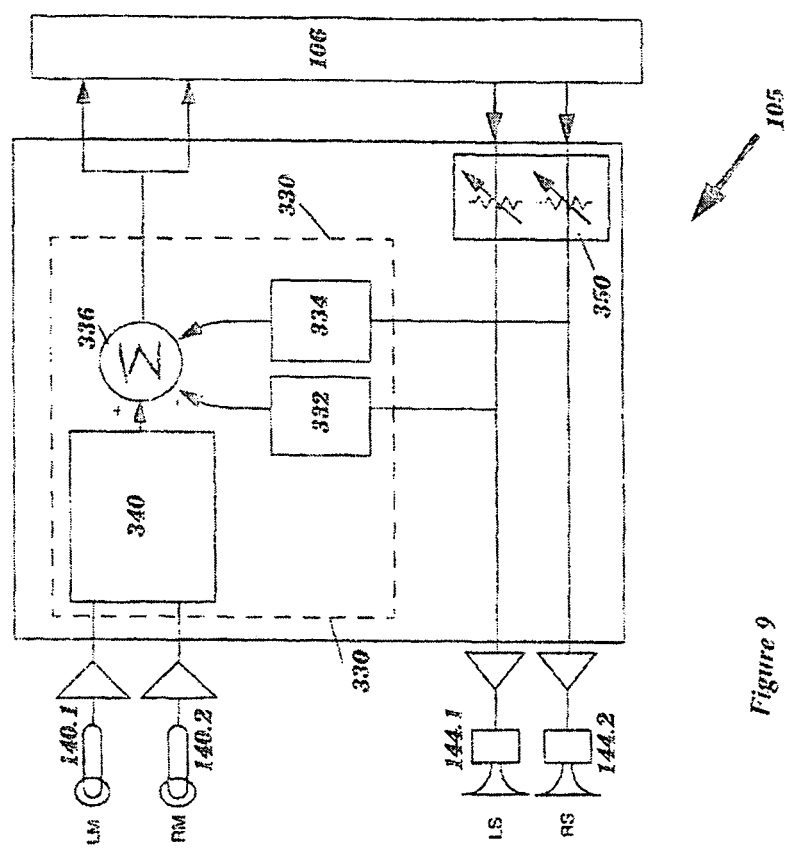
FIG. 9 is a block diagram of an adaptive echo-canceled mono-output synthetic aperture microphone arrangement, assuming stereo speakers, within the audio signal conditioning unit, which is of particular value in noisy environments such as office cubicles or service depot areas.

FIG. 9 is a block diagram of an adaptive echo-canceled mono synthetic aperture microphone unit 105 within the audio signal conditioning unit 104. With reference to FIG. 8, like reference numbers designate like elements. The adaptive echo-canceled mono synthetic aperture microphone unit 105 comprises the volume control unit 350 plus a synthetic aperture microphone processing unit 330, which may include hardware and/or software. The synthetic aperture microphone processing unit 330 comprises a synthetic aperture microphone unit 340 which may include hardware and/or software to implement synthetic aperture microphone processing algorithms; a synthetic microphone/left speaker (SM/LS) model 332; a synthetic microphone/right speaker (SM/RS) model 334; and a signal summing circuit 336, each coupled in the manner shown.

The synthetic aperture microphone unit 330 is coupled to receive the left and right microphone signals, and additionally includes conventional adaptive coefficient weighting and training couplings. Taken together, the synthetic aperture microphone unit 330, the left microphone 140.1, and the right microphone 140.2 (plus one or more additional microphones that may be present) form a mono-output synthetic aperture microphone. The synthetic aperture microphone unit 330 performs delay and/or frequency dispersion operations upon the left and right microphone signals to internally create or define an audio reception sensitivity distribution pattern in a manner readily understood by those skilled in the art. The audio reception sensitivity distribution pattern includes one or more spatial regions referred to as "hot-spots," as well as a set of spatial regions referred to as "rejection regions." Typically, a set of one or more "hot-spots" includes a primary hot-spot of maximal audio reception sensitivity that has a particular position or orientation relative to the geometry of the microphone array 140.1, 140.2. The rejection regions comprise spatial positions in which the synthetic aperture microphone has minimal audio reception sensitivity.

Figure 10:
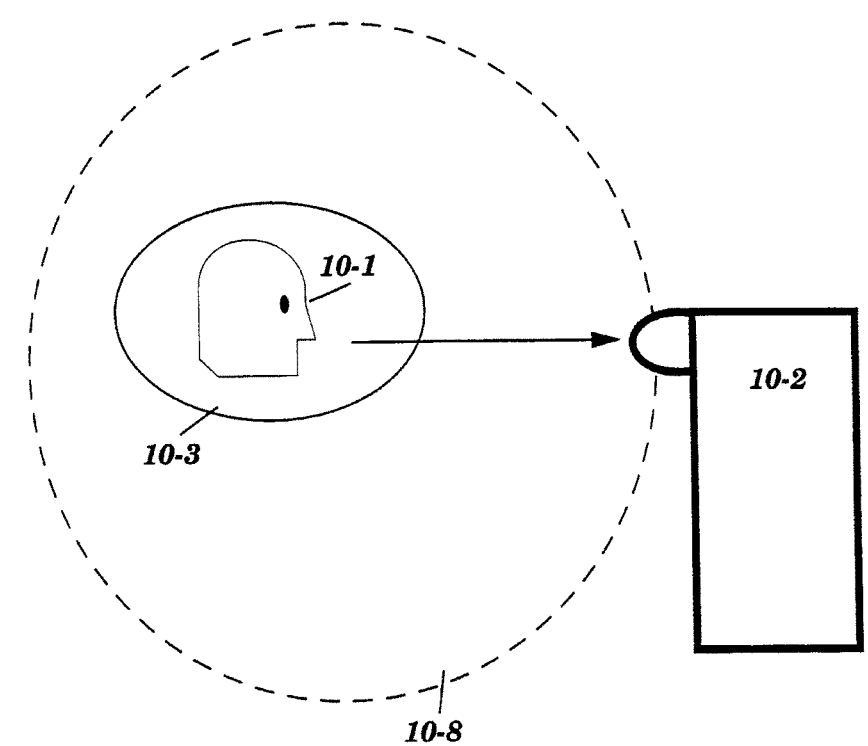
FIG. 10 is an illustration showing an exemplary localized primary hot-spot, within which the synthetic aperture microphone has enhanced sensitivity to sound waves produced by a user.
Figure 11:
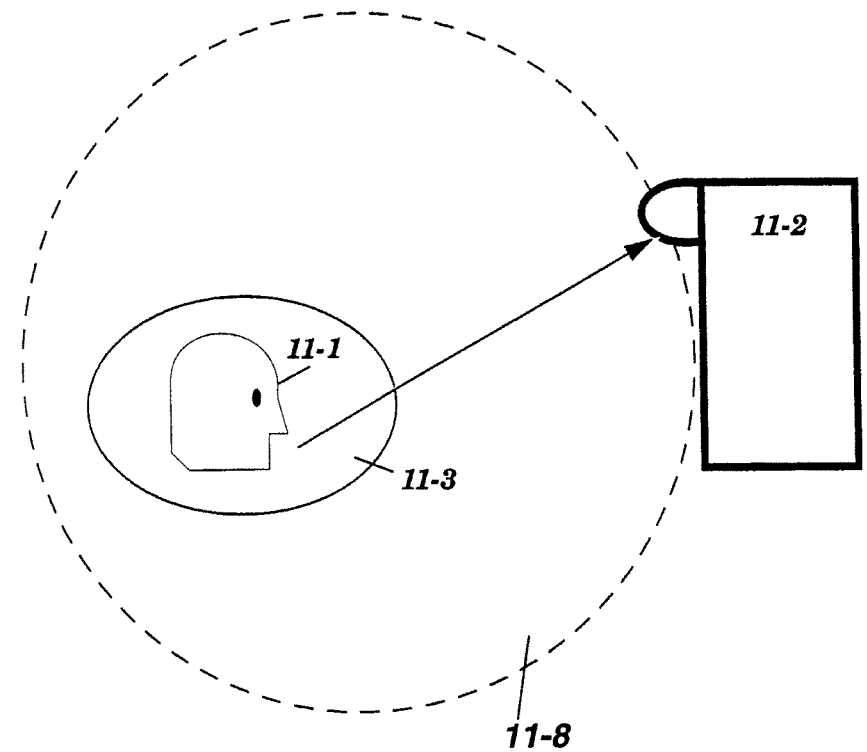
FIG. 11 is an illustration showing exemplary primary hot-spot directivity, where the synthetic aperture microphone captures or rejects directionally-specific sound energy from a user within a primary hot-spot that is offset relative to that shown in FIG. 10.

FIG. 10 is an illustration showing an exemplary localized primary hot-spot 10-3 and a surrounding rejection region 10-8. Within the primary hot-spot 10-3, the synthetic aperture microphone 10-2 can detect sound waves produced by a speaker 10-1. The location of the primary hot-spot may be adjusted in accordance with particular conditions in an acoustic environment. In one embodiment, the position or orientation of the primary hot-spot may be modified under software control. This in turn could facilitate user-directed hot-spot positioning for optimizing audio performance in different acoustic situations. FIG. 11 is an illustration showing exemplary primary hot-spot directivity, where the synthetic aperture microphone 11-2 captures directionally-specific speech energy from a user 11-1 within a primary hot-spot 11-3 that is offset relative to that shown in FIG. 10. A rejection region 11-8 exists outside the primary hot-spot 11-3 in a conventional manner.

Figure 12:
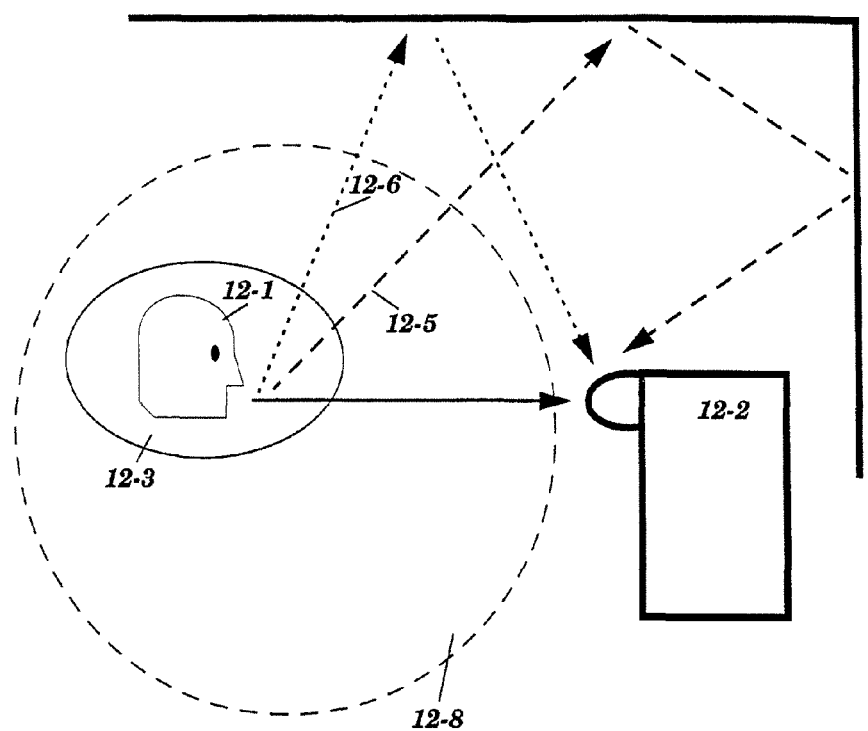
FIG. 12 is an illustration showing exemplary reflected speech energy rejection by the synthetic aperture microphone.

The synthetic aperture microphone can additionally reject reflected speech energy that originated within the primary hot-spot and that approaches the microphone array 140.1, 140.2 from angles beyond those that span the primary hot-spot. FIG. 12 is an illustration showing exemplary reflected speech energy rejection. The synthetic aperture microphone 12-2 detects sound waves produced by a user 12-1 within a primary hot-spot 12-3. The synthetic aperture microphone 12-2 rejects sound waves 12-5, 12-6 originating within the primary hot-spot 12-3 and reflected from nearby surfaces because the reflected sound waves are likely to travel through one or more rejection regions 12-8 along their reflection path.

Figure 13:
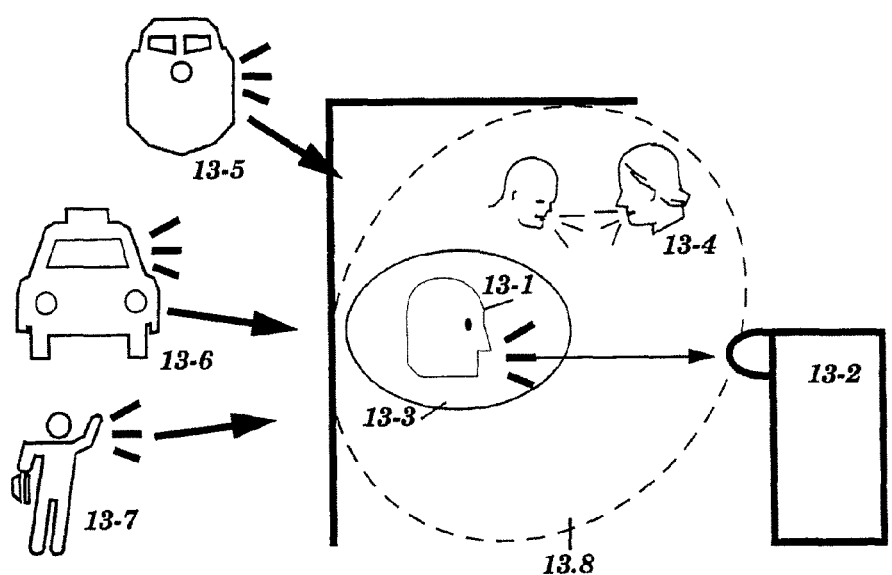
FIG. 13 is an illustration showing exemplary ambient audio noise rejection by the synthetic aperture microphone.

The synthetic aperture microphone is further advantageous by virtue of good ambient acoustical noise rejection performance. FIG. 13 is an illustration showing exemplary ambient audio noise rejection, in which a synthetic aperture microphone 13-2 rejects conversational noise 13-4 and various forms of outside or environmental noise 13-5, 13-6, 13-7. The noise and noise reflections traveling towards the microphone array 140.1, 140.2 enter a rejection region 13-8 through various directions, and hence are strongly attenuated via the synthetic aperture microphone's directional rejection behavior. This is in contrast to a user 13-1 within a primary hot-spot 13-3, who produces sound waves that the synthetic aperture microphone 13-2 readily detects with high sensitivity.

Referring also now to FIGS. 5 and 9, the synthetic aperture microphone unit 330 outputs a mono microphone signal having a magnitude that most directly corresponds to the amount of audio energy present within the set of hot-spots, and in particular the primary hot-spot. The synthetic aperture microphone output signal has little contribution from audio energy entering from any rejection region directions. Those of ordinary skill in the art will understand that multiple microphones can be used to extract voice information from background noise that is in fact louder than the actual speech using adaptive cancellation techniques such as those described by Boll and Pulsipher in IEEE Transactions on Acoustics, Speech, and Signal Processing, Vol. ASSP-28, No. 6, December 1980. This could be incorporated as a third operational mode for the audio DSP, for supporting extreme noise environments as might be found on public streets or repair depots, for example.

The volume control unit 350 is coupled to the left and right speaker signals, as are the SM/LS and SM/RS models 332, 334. The signal summing circuit 336 is coupled to the output of the synthetic aperture microphone unit 340, as well as outputs of the SM/LS and SM/RS models 332, 334, and delivers an echo-canceled mono synthetic aperture microphone signal to the A/V switch 106.

In one embodiment, the adaptive echo-canceled synthetic aperture microphone unit 105 comprises DSP hardware and/or software. The present invention can thus provide either adaptive echo-canceled stereo microphone or adaptive echo-canceled mono synthetic aperture microphone capabilities in response to user selection. In an exemplary embodiment, the adaptive echo-canceled synthetic aperture microphone unit 105 is implemented in a DSP such as the Texas Instruments TMS320C54x processor referenced above. Those skilled in the art will recognize that a single DSP system can be configured to provide both the adaptive echo-canceled stereo and mono synthetic aperture microphone capabilities described herein as distinct or integrated operating modes.

In the event that a user employs an earphone, headphone set, or AUX audio devices in conjunction with the present invention, the synthetic aperture microphone unit 330 is placed in a bypassed, inactive, or quiescent state and the DSP and/or volume control unit 350 facilitate conventional normalization and adjustment of output signal amplitude, in a manner understood by those skilled in the art. Alternatively, separate normalization and/or volume control circuitry could be provided to accommodate the aforementioned devices.

Referring again to FIG. 5, the A/V switch 106 comprises conventional analog switching circuitry that is coupled to the preamplifier and buffer unit 102, the audio signal conditioning unit 104, the analog A/V UTP transceiver 108, and the A/D-D/A converters 116a. The A/V switch 106 further maintains a coupling to the internal bus 115, thereby facilitating processor control over A/V switch operation.

The A/V switch 106 routes incoming signals generated by the left and right microphones 140.1, 140.2 (or larger microphone array), the camera 142, and/or any AUX A/V input devices to the analog A/V UTP transceiver 108 or the A/D-D/A converters 116a under the direction of a control signal received via the internal bus 115. Similarly, the A/V switch 106 selects either the analog A/V UTP transceiver 108 or the A/D-D/A converters 116a as a source for outgoing signals directed to the left and right speakers 144.1, 144.2, the display device 146, and/or any AUX A/V output devices.

The analog A/V UTP transceiver 108 comprises a conventional analog A/V transceiver that provides a signal interface to a first set of UTP wires that carry analog A/V signals and which couple the analog A/V UTP transceiver 108 to the pair splitter 110. The pair splitter 110 is further coupled to the first digital transceiver 111 via a second set of UTP wires that carry digital A/V signals. The analog A/V UTP transceiver 108 may be reconfigurable, supporting a range of analog 4-pair, 2-pair, or 1-pair signal transmission methodologies. The selection of any particular signal transmission methodology may be performed under processor control or by physical configuration switching. Similarly, distance compensation adjustments may be performed under processor control or via physical switching, or alternatively through automatic compensation techniques in a manner understood by those skilled in the art.

The first and second digital transceivers 111, 135 provide conventional digital interfaces to UTP wiring, and are coupled to the routing unit 112 in the manner shown. The second digital transceiver 135 is further coupled to the companion computer port 136. The first and second digital transceivers 111, 135 may be implemented using portions of a standard NIC, as described below, or by other means. In addition to the aforementioned couplings, the routing unit 112 is coupled to the network interface unit 114. The routing unit 112 comprises conventional network hub or mini-hub circuitry. In one embodiment, the routing unit 112 performs hard-wired signal distribution and merge functions. In an alternate embodiment, the routing unit 112 performs data packet delivery path selection operations.

The network interface unit 114 comprises conventional network interface circuitry, for exchanging data with the internal bus 115 and data packets with either the multimedia network 60 or a companion computer 50 via the premises and companion computer network ports 138, 136 in accordance with a conventional networking protocol. In one embodiment, the network interface unit 114 is implemented as at least one standard NIC. The NIC may typically include built-in data packet address examination or screening capabilities, and hence simplify the routing unit's function to one of communications distribution and merge functions in such an embodiment. These distribution and merge functions serve to provide simultaneous signal or packet exchange among each of the premises network port 138, the NIC 114, and the companion computer port 136. One advantage of an embodiment employing a standard NIC is that the NIC could be easily replaced or upgraded to accommodate technological evolution. This range of possibilities is further enhanced by the switching arrangement described below with reference to FIG. 15. Although not shown, it is again understood that should ISDN support be deemed valuable, network connectors, interface electronics, inverse multiplexers, and Q.931 call control can be introduced through, for example, connection to the internal bus 115 in a manner familiar to those skilled in the art.

Figure 14:
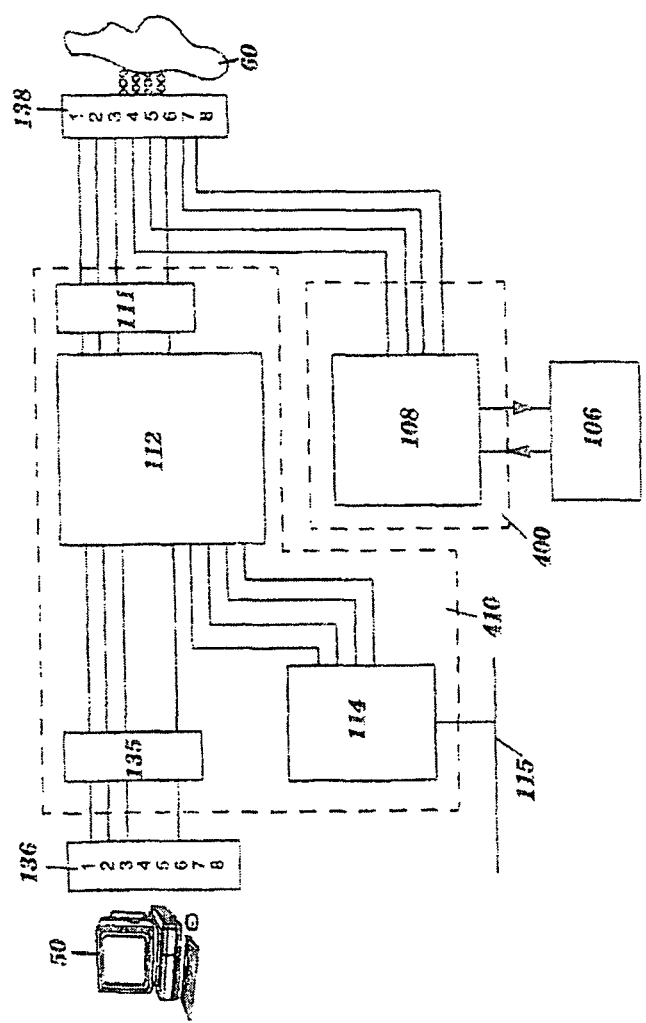
FIG. 14 is a block diagram of a first embodiment of a first and a second multimedia network interface provided by the present invention.

Taken together, the premises network port 138, the pair splitter 110, the analog A/V UTP transceiver 108, the digital transceiver 111, the routing unit 112, the network interface unit 114, and the companion computer port 136 form 1) a first multimedia network interface for handling analog A/V signals; and 2) a second multimedia network interface for handling digital A/V and data networking signals. FIG. 14 is a block diagram of a first embodiment of a first 400 and a second 410 multimedia network interface provided by the present invention. The first multimedia network interface 400 comprises the aforementioned first set of UTP wires plus the analog A/V UTP transceiver 108. The first multimedia network interface 400 facilitates the exchange of analog A/V signals between the premises network port 138 and the analog A/V UTP transceiver 108. The second multimedia network interface 410 comprises the second set of UTP wires, the digital transceiver 111, the routing unit 112, and the network interface unit 114, which are coupled in the manner shown. In some implementations, the digital transceiver 135 may also be a NIC that may be either similar to or different from a NIC employed in the network interface unit 114. The second multimedia interface 410 facilitates the exchange of digital A/V and data networking signals between the premises network port 138, the network interface unit 114, and the companion computer port 136.

Figure 15:
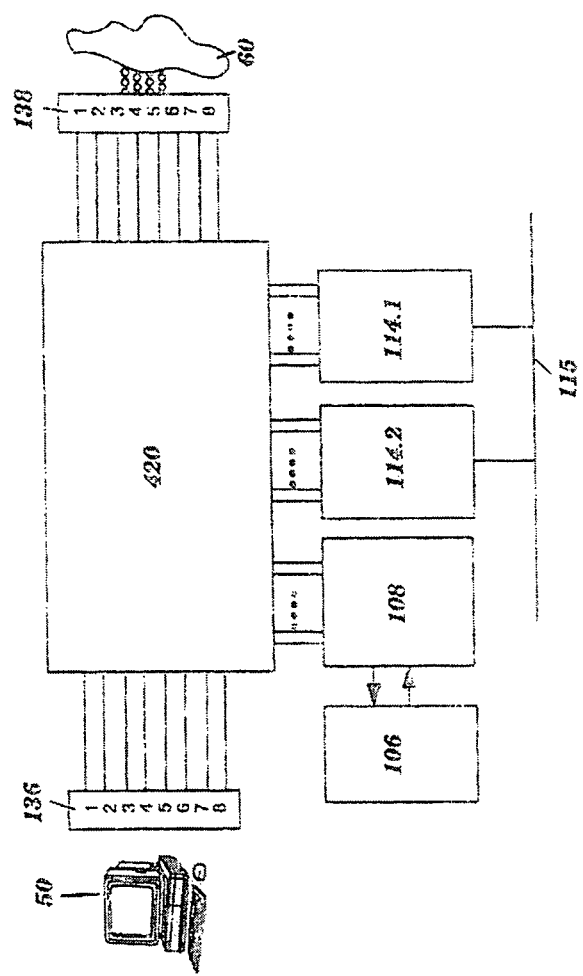
FIG. 15 is a block diagram of a second embodiment of a first and a second multimedia network interface provided by the present invention.

FIG. 15 is a block diagram of a second embodiment of first and second multimedia network interfaces provided by the present invention. The first and second multimedia network interfaces are implemented via a passive switching arrangement and/or an active analog switching matrix 420 that includes low-capacity, high-frequency analog protection devices. Such protection devices may comprise three-terminal, back-to-back diode arrangements, as employed in a Motorola BAV99LT1 (Motorola, Inc., Schaumberg, Ill.). In this arrangement, the analog transceiver 108 may support a number of 4, 2, and 1 pair formats, which may be dictated by the marketplace. Alternatively, the analog transceiver 108 can be a replaceable module.

In the event that data networking is implemented via Gigabit Ethernet or other network protocol that conventionally consumes the entire physical capacity of an entire RJ-45 connector, the present invention may employ an additional RJ-45 or other type of connector for carrying analog A/V signals.

Via the second multimedia network interface, the present invention provides internal data communication transmit, receive, and routing capabilities. An external or companion computer 50 can therefore issue control signals directed to the present invention in accordance with standard data networking protocols. The second multimedia network interface can also provide "loop-through" signal routing between the premises network port 138 and the companion computer port 136. Additionally, the data routing capabilities provided by the second multimedia network interface facilitate coupling to both existing broadcast or switching hubs. The second multimedia network interface also supports the transfer of digital A/V streams. Thus, the second multimedia network interface cleanly separates data communications directed to one or more companion computers 50, the multimedia network 60, and the multimedia collaboration device 10.

Once again referring to FIG. 5, each of the A/V switch 106, the analog A/V UTP transceiver 108, the routing unit 112, the network interface unit 114, the A/V codec 116$b$, the set of processors 118.1, 118.$n$, the memory 120, and the I/O interface 130 is coupled to the internal bus 115. The A/V codec 116$b$ is further coupled to the A/D-D/A converters 116$a$, which are coupled to the A/V switch 106. It is noted that the A/D-D/A converters 116$a$ may include color-space conversion capabilities to transform between RGB and YUV or other advantageous color spaces.

The memory 120 comprises Random Access Memory (RAM) and Read-Only Memory (ROM), and stores operating system and application software 122, 124. Depending upon the nature of the processors 118.1, 118.$n$, the operating system 122 could comprise a scaled-down, conventional, or enhanced version of commercially-available operating system software, and/or special-purpose software. In an exemplary embodiment, the operating system 122 comprises Windows CE (Microsoft Corporation, Redmond, Wash.) or another commercial product selected in accordance with the particular environment in which the present invention is employed. The application software 124 may comprise programs for performing videoconferencing, messaging, publishing, broadcast reception, and media-on-demand operations, and internet browsing using programs such as Netscape Navigator (Netscape Communications Corporation, Mountain View, Calif.). Depending upon the nature of the processors 118.1, 118.$n$, the internet browser program could be a scaled down, conventional, or augmented version of a commercially-available browser.

The processors 118.1, 118.$n$ manage communication with the network interface unit 114, and control the overall operation of the multimedia collaboration device 10 in accordance with control signals received via the network interface unit 114. The processors 118.1, 118.$n$ additionally provide graphics overlay capabilities, and may further provide internet browsing capabilities in conjunction with application software 124 as previously described. Relative to managing communication with the network interface unit 114, the processors 118.1, 118.$n$ may manage protocol stacks and/or state machines. With regard to controlling the overall operation of the multimedia collaboration device 10, the processors 118.1, 118.$n$ issue control signals to the A/V switch 106 and execute application software resident within the memory 120. The graphics overlay capabilities facilitate the placement of fonts, cursors, and/or graphics over video present upon the display device 146. With sufficient processing power, the present invention can serve as a stand-alone, real-time video-capable internet appliance.

As described above, the A/D-D/A converters 116$a$ may comprise conventional circuitry to perform color-space conversion operations in addition to analog-to-digital and digital-to-analog signal conversion. The A/V codec 116$b$ comprises conventional A/V signal encoding and decoding circuitry, and provides the present invention with compression and decompression capabilities. Together these enable the present invention to encode and decode A/V streams without loading down a companion computer's processing and networking power. Either of the first or second multimedia network interfaces described above can route digital A/V signals to the A/V codec 116$b$, while routing non-A/V signals to the companion computer 50. The present invention's ability to encode and decode A/V signals independent of a companion or external computer is particularly advantageous in situations in which video signal encoding and decoding must occur simultaneously, such as in 2-way teleconferencing or network-based video editing applications. The present invention may support network-based video editing applications based upon a high bandwidth near-zero-latency compression approach, which can be implemented, for example, through JPEG or wavelet compression operations; or an interim compression approach.

In one embodiment, the A/V codec 116$b$ comprises a chip or chipset. In another embodiment, the A/V codec 116$b$ comprises a processor 118.$k$ capable of performing compression and decompression operations. In more advanced implementations, the A/V codec 116b could comprise a single processor 118.m capable of performing user interface functions in addition to A/V compression and decompression operations. Such an implementation could also provide an Application Program Interface (API) in conjunction with operating system software 122. In an exemplary embodiment of such an implementation, the A/V codec 116b may comprise a NUON processor (VM Labs, Mountain View, Calif.).

4.4 Additional Embodiments

FIG. 6 is a block diagram of a second embodiment of a multimedia collaboration device 20, which provides primary support for analog audio I/O and digital visual I/O, and further supports analog and digital auxiliary A/V I/O, plus networked digital streaming. Relative to FIG. 5, like reference numbers designate like elements.

The second embodiment of the multimedia collaboration device 20 includes a digital camera 152, a digital display device 154, a digital AUX A/V interface 156, and a stream selector 158. The digital camera 152 and the digital display device 154 respectively capture and display images in a conventional manner. The digital AUX A/V interface 156 facilitates bidirectional coupling to auxiliary digital A/V devices, such as an external computer, a digital VCR, or Digital Versatile Disk (DVD) player. Each of the digital camera 152, the digital display device 154, and the digital AUX A/V interface 156 is coupled to the stream selector 158, which is coupled to the A/V codec 116b.

The stream selector 158 comprises conventional circuitry that selectively routes digital streams between the A/V codec 116b and the digital camera 152, the digital display device 154, and the digital AUX A/V interface 156. The stream selector 158 may route incoming digital image streams received from either of the digital camera 152 or the digital AUX A/V interface 156 to the A/V codec 116b. In one embodiment, the stream selector 158 may be capable of multiplexing between these two incoming digital stream sources. Undersampling may also be used to facilitate the compositing of multiple video images. Relative to outgoing digital image streams, the stream selector 158 may route such streams to either or both of the digital display device 154 and digital AUX A/V interface 156, where such routing may occur in a simultaneous or multiplexed manner. The stream selector 158 additionally facilitates the exchange of digital audio streams between the A/V codec 116b and the digital AUX A/V interface 156.

The A/V codec 116b and the A/D-D/A converters 116a together facilitate the conversion of digital A/V signals associated with the digital camera 152, the digital display device 154, and/or auxiliary digital A/V devices into analog A/V signals. The A/V switch 106 facilitates exchange of these analog A/V signals with AUX A/V devices and/or the premises network port 138.

Because the A/V codec 116b is also coupled to the internal bus 115 and hence to the network interface unit 114, digital A/V signals captured from the digital camera 152 or directed to the digital display 154 or received from the digital AUX A/V interface 156 may be packetized and exchanged via the premises network port 138 and/or the companion computer port 136.

FIG. 7 is a block diagram of a third embodiment of a multimedia collaboration device 30, which provides primary support for analog audio I/O and digital visual I/O, support for digital auxiliary A/V I/O, and support for networked digital streaming. Relative to FIGS. 5 and 6, like reference numbers designate like elements.

The third embodiment of the multimedia collaboration device 30 includes a digital camera 152, a digital display device 154, a digital AUX A/V interface 156, and a stream selector 158 in the manner described above. Analog audio signals associated with the microphones 140.1, 140.2 and speakers 144.1, 144.2 are routed through the A/D-D/A converters 116a and A/V codec unit 116b. Thus, the third embodiment of the present invention manages digital A/V streams, and may exchange such streams with the multimedia network 60 and/or a companion computer 50. The third embodiment of the multimedia collaboration device 30 does not transmit analog A/V signals over the multimedia network 60, and hence the analog switching unit 106, the analog A/V UTP transceiver 108, and the pair splitter 110 described above relative to the first and second multimedia collaboration device embodiments are not required.

4.5 Camera and Display Device Integration

As previously indicated, placement of the camera 142 in close proximity to the display device 146 aids in maintaining good user eye-contact with a displayed image, thereby closely approximating natural face-to-face communication in videoconferencing situations. Essentially perfect eye-contact can be achieved by integrating a large-area photosensor array with a large-area array of emissive or transmissive devices that form the basis for display device pixels.

Multiple photosensor and display element integration techniques exist. In general, the formation of an image using a photosensor array necessitates the use of optical elements in conjunction with photosensor elements. Photosensor and display element integration techniques are described in detail hereafter, followed by image formation considerations relative to integrated photosensor/display element arrays.

4.6 Display Pixel and Photosensor Element Interleaving

Figure 16:
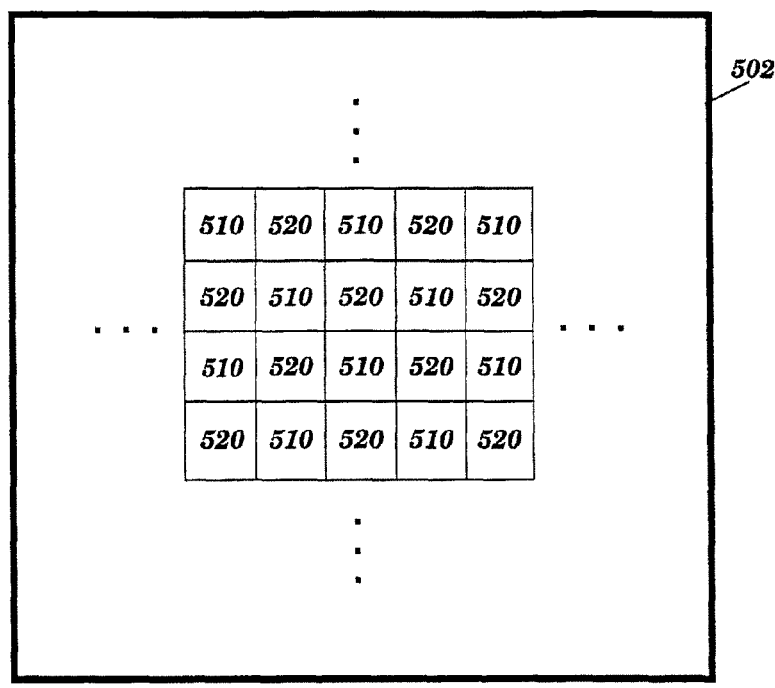
FIG. 16 is an illustration of a first photosensor and display element planar interleaving technique.

One way of integrating photosensor elements with emissive or transmissive display elements is via element interleaving. FIG. 16 is an illustration showing a first photosensor and display element interleaving technique, in which display elements 510 and photosensor elements 520 populate a viewing screen 502 in an alternating manner. Each display element 510 generates or transmits light corresponding to a particular color or set of colors. Similarly, each photosensor element 520 detects light corresponding to a particular color. As described in detail below, display elements 510 and photosensor elements 520 operate in a temporally and/or spatially separated manner relative to each other to ensure that image capture is essentially unaffected by image display.

Display and photosensor elements 510, 520 corresponding to a particular color are interleaved in accordance with a color distribution scheme. FIG. 17 is an illustration of an exemplary photosensor element color and display element color distribution scheme. In FIG. 17, display elements 510 corresponding to the colors red, green, and blue are identified via the uppercase letters R, G, and B, respectively. Photosensor elements 520 corresponding to red, green, and blue are respectively identified by the lowercase letters r, g, and b. Display elements 510 corresponding to a particular color are offset relative to each other, and interleaved with display and photosensor elements 510, 520 corresponding to other colors. Similarly, photosensor elements 520 corresponding to a particular color are offset relative to each other, and interleaved with display and photosensor elements 510, 520 corresponding to other colors. Those skilled in the art will recognize that a variety of photosensor and display element color distribution schemes are possible.

Figure 18:
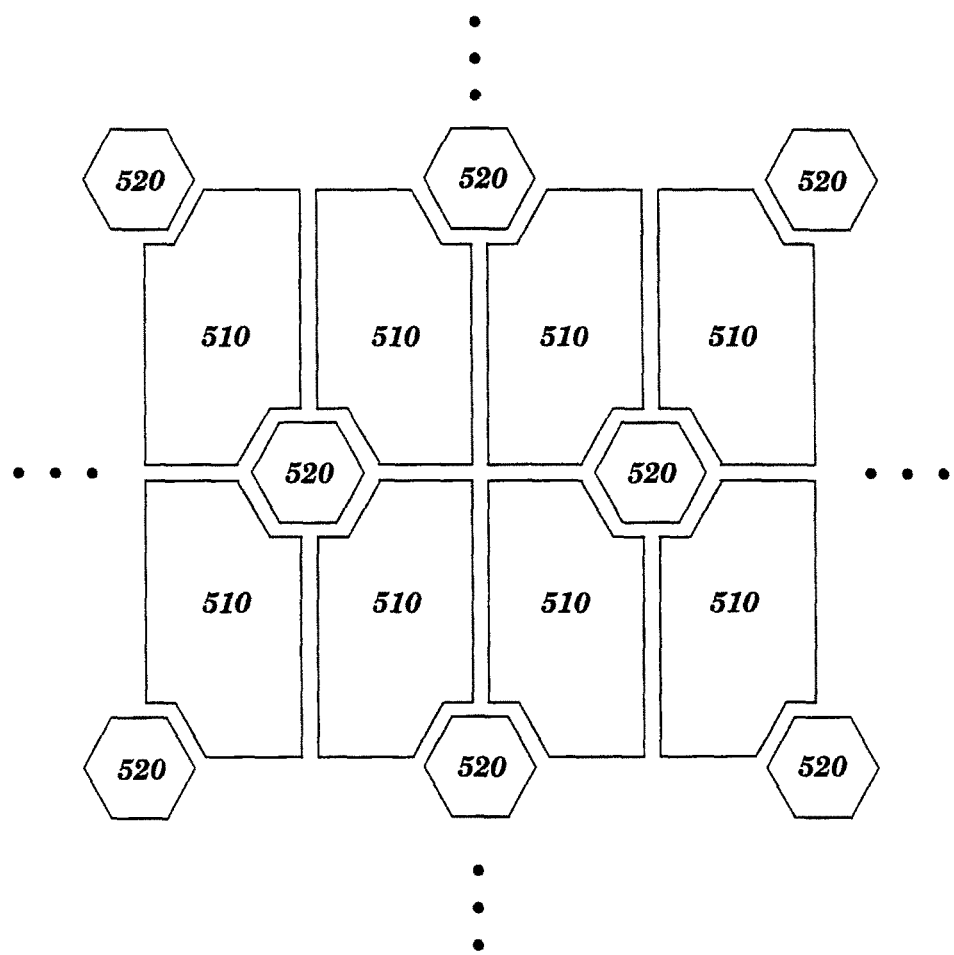
FIG. 18 is an illustration of a second alternating photosensor and display element interleaving technique, in which photosensor and display element geometries and size differentials aid in minimizing pixel pitch and maximizing displayed image resolution.

The presence of photosensor elements 520 interleaved with display elements 510 reduces image resolution, and increases pixel pitch (i.e., the spacing between pixels). To minimize the effect that the photosensor elements 520 have upon the appearance of a displayed image, photosensor elements 520 having or consuming a smaller area than the display elements 510 are employed. Furthermore, various display and photosensor element layout geometries may be used to produce an interleaving pattern that closely approximates display element pitch found in conventional display devices. FIG. 18 is an illustration of a second photosensor and display element interleaving technique, in which photosensor and display element geometries and size differentials aid in minimizing pixel pitch and maximizing displayed image resolution. Since a viewer's eye will integrate or average the light output by groups of display elements 510, interleaving techniques of the type shown in FIG. 18 ensure that the viewer will perceive a high-quality image. Those skilled in the art will understand that various microoptic structures or elements, such as microlenses, could be employed in the nonluminent spaces between display elements 510 and/or photosensor elements 520 to reduce or minimize a viewer's perception of nonluminent areas in a displayed image. Such microoptic structures are elaborated upon below.

The display elements 510 referred to herein may comprise essentially any type of conventional light emitting or transmitting device, such as a Light Emitting Diode (LED) or Liquid Crystal Display (LCD) pixel element. Similarly, the photosensor elements 520 may comprise essentially any type of conventional light sensing or detecting device. For example, the photosensor elements 520 could comprise photodiodes, such as Schottky or p-i-n photodiodes; phototransistors; capacitive or charge-coupled devices (CCDs); charge modulated devices (CMDs); or other types of light-sensitive devices. The photosensor elements 520 could be fabricated, for example, using standard semiconductor processing techniques employed during the manufacture of flat panel displays.

In a typical display device, a single display element 510 is used to output light of a particular color. Display elements 510 based upon organic electroluminescence are capable of simultaneously generating light comprising multiple wavelengths in the visible spectrum, and form the basis for full-color LED arrays. In particular, a single Stacked Organic Light Emitting Diode (SOLED) pixel element can produce red, green, and blue light. The intensity of each color is independently tunable, as is each color's mean wavelength. Thus, a single SOLED can form a full-color pixel. As an alternative to organic electroluminescent materials, the present invention may employ other full-color transparent or semitransparent luminescent materials, such as light-emitting and/or light-responsive polymer films.

Figure 19:
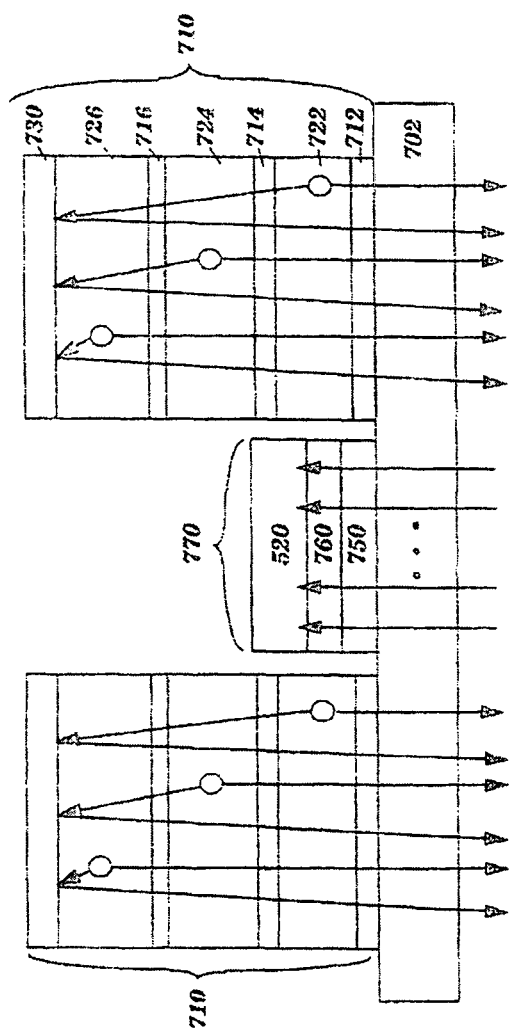
FIG. 19 is a cross-sectional view showing a full-color pixel array integrated with a photosensor element array upon a common substrate.

FIG. 19 is a cross-sectional view showing a full-color pixel array integrated with a photosensor element array upon a common substrate 702 such as glass or plastic. As an example, a SOLED 710 is considered as the full-color pixel technology in the discussion that follows. Those skilled in the art will understand that the concepts described herein can be applied to other full-color pixel technologies. Each SOLED 710 comprises a first, second, and third semitransparent electrode 712, 714, 716; a first, second, and third organic electroluminescent layer 722, 724, 726; and a reflecting contact layer 730, in a manner understood by those skilled in the art. Each electroluminescent layer 722, 724, 726 emits light in a particular wavelength range in response to an applied electric field. For example, the first, second, and third organic electroluminescent layers 722, 724, 726 could respectively output blue, green, and red light.

A color filter 750, an optional microoptic structure 760, and a photosensor element 520 form a color-specific photosensor element 770 that is fabricated adjacent to each SOLED 710. The microoptic 760 may comprise one or more microlenses, apertures, and/or other types of planar optic structures, and serves to focus incoming light onto the photosensor element 520 to aid image formation in the manner described below. The microoptic structure 760 may be formed through the application of conventional microlens or planar optic fabrication techniques during photosensor element fabrication steps. For example, the microoptic structure 760 may be formed by depositing a selectively-doped dielectric or dielectric stack prior to or during photosensor element fabrication, in a manner well understood by those skilled in the art.

The color-specific photosensor element 770 may also include one or more antireflection layers, which are deposited in a conventional manner. Additionally, one or more types of passivation or isolation materials, such as Silicon Dioxide, Silicon Nitride, Polyimide, or spin-on-glass may be deposited in between each SOLED 710 and color-specific photosensor element 770 in a manner understood by those skilled in the art.

Each color-specific photosensor element 770 detects light characterized by a specific wavelength interval. Thus, while any given SOLED 710 may simultaneously output red, green, and/or blue light, separate color-specific photosensor elements 770 are used to individually detect red, green, and blue light. Because each SOLED 710 forms a full-color pixel, integration of a SOLED array with a photosensor array in the manner shown in FIG. 19 is particularly advantageous relative to providing a high-resolution display having image capture capabilities.

Figure 20:
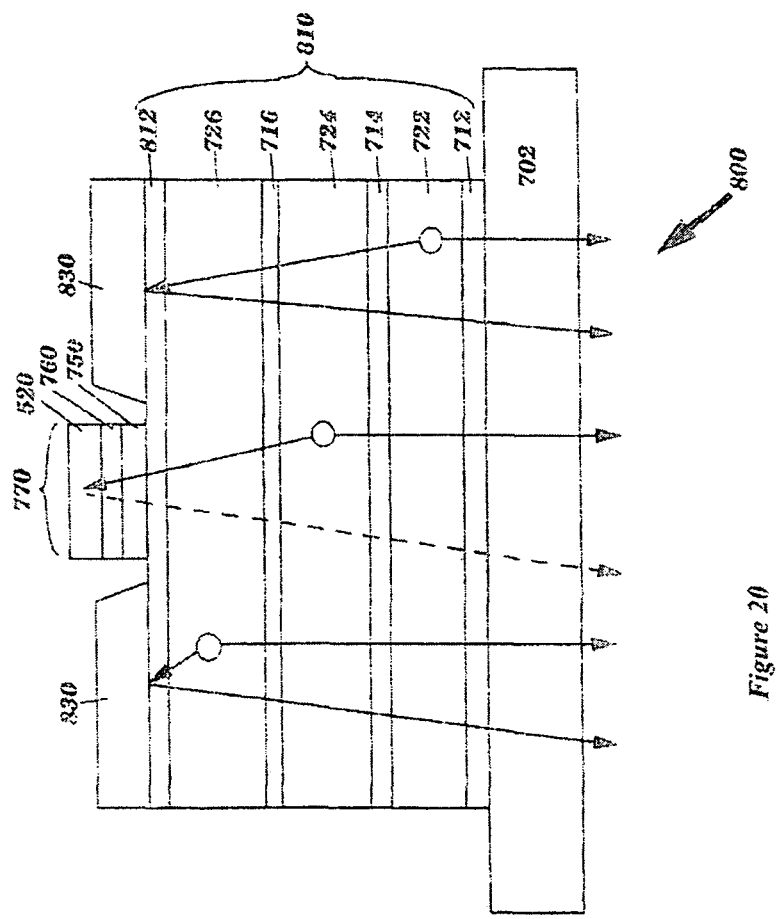
FIG. 20 is a cross-sectional view showing an integrated full-color pixel/photosensor element, which may form the basis of an integrated display element/photosensor element array.

4.7 Display and Photosensor Element Stacking
a) Integrated SOLED/Photosensor Element A full-color pixel element such as a SOLED 710 and a color-specific photosensor element 770 can be integrated together, such that the incorporation of a photosensor element array into a display element array can be accomplished essentially without a resolution or pixel pitch penalty. FIG. 20 is a cross-sectional view showing an integrated full-color pixel/photosensor element 800, which may form the basis of an integrated display element/photosensor element array. For purpose of example, the full-color pixel element is considered to be a SOLED 810 in the description that follows. Those skilled in the art will understand that other types of full-color pixel technologies could be used to produce the integrated full-color pixel/photosensor element 800 described hereafter.

Relative to FIG. 19, like reference numbers designate like elements. The full-color pixel/photosensor element 800 comprises a SOLED 810 having a color-specific photosensor element 770 fabricated thereupon. The full-color pixel/photosensor element 800 is fabricated upon a substrate 702 such as glass. The SOLED 810 comprises a first, a second, a third, and a fourth semitransparent electrode 712, 714, 716, 812; a first, second, and third organic electroluminescent layer 722, 724, 726; and a patterned reflecting contact layer 830.

With the exception of the fourth semitransparent electrode 812 and the patterned reflecting contact layer 830, the SOLED 810 shown in FIG. 20 is essentially the same as that depicted in FIG. 19. The fourth semitransparent electrode 812 serves as one of the electrodes for the photosensor element 520 within the color-specific photosensor element 770, in a manner readily understood by those skilled in the art. Deposition of the fourth semitransparent electrode 812 may not be required under the patterned reflecting contact layer 830, and as such the SOLED 810 and color-specific photosensor element 770 may not share a common electrical interface layer.

The patterned reflecting contact layer 830 comprises conventional contact materials or metals that have been patterned to include a gap or opening.

The color-specific photosensor element 770 is fabricated on top of the fourth semitransparent electrode 812, in the opening defined in the patterned reflecting contact layer 830. The color-specific photosensor element 770 thus detects light that has been transmitted through the substrate 702 and each of the first through fourth semitransparent electrodes 712, 714, 716, 812. Those skilled in the art will understand that the location of the opening defined in the patterned reflecting contact layer 830, and hence the location of the color-specific photosensor element 770 upon the SOLED 810, may vary among adjacent full-color pixel/photosensor elements to ensure that the human observer perceives a high-quality displayed image. The SOLED 810 and the color-specific photosensor element 770 may operate in a temporally-separated manner to ensure that image capture is essentially unaffected by image display, as further elaborated upon below.

b) Stacked Full-Color Emitter/Full-Color Detector Structures

A full-color pixel element, such as a stacked organic electroluminescent (SOE) structure, may also be used to detect light. Thus, a single structure based upon full-color materials technology may be used for both RGB light emission and RGB light detection, thereby advantageously facilitating the integration of a photosensor element array and a display element array while maintaining small pixel pitch and high image resolution.

Figure 21:
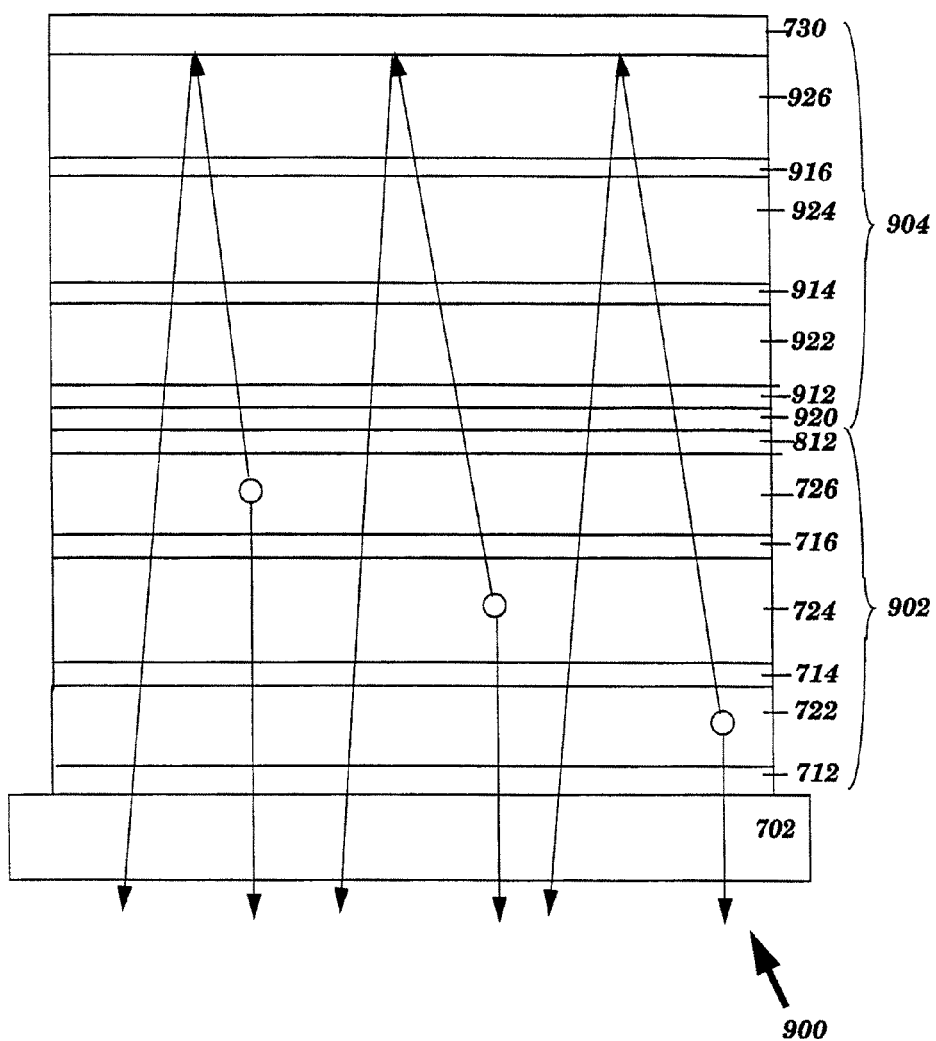
FIG. 21 is a cross-sectional view of a first full-color emitter/detector.

FIG. 21 is a cross-sectional view of a first full-color emitter/detector 900. In the description that follows, the first full-color emitter/detector 900 is considered to be an SOE-based device. Those skilled in the art will recognize that other full-color technologies could be employed to produce the first full-color emitter/detector 900 in alternate embodiments.

Relative to FIGS. 19 and 20, like reference numbers designate like elements. The first full-color emitter/detector 900 is fabricated upon a substrate 702 such as glass, and comprises first through seventh semitransparent electrodes 712, 714, 716, 812, 912, 914, 916; first through sixth organic electroluminescent layers 722, 724, 726, 922, 924, 926; an optional microoptic structure 920; and a reflecting contact layer 730.

In the first full-color emitter/detector 900, the first through third organic electroluminescent layers 722, 724, 726 serve as RGB light emitters controlled by voltages applied to the first through fourth semitransparent electrodes 712, 714, 716, 812, and thus form a SOLED 902. The microoptic structure 920 comprises one or more microlenses, apertures, and/or other planar microoptic structures that focus incoming light into the fourth, fifth, and sixth organic electroluminescent layers 922, 924, 926, which in turn produces or induces pairwise voltage differences across the fifth, sixth, and seventh semitransparent electrodes 912, 914, 916 and the reflecting contact layer 730. The microoptic structure 920, the fourth through sixth organic electro-luminescent layers 922, 924, 926, the fifth through seventh semitransparent electrodes 912, 914, 916, and the reflecting contact layer 730 therefore form a first SOE photosensor 904 for detecting RGB light.

Light emitted by the SOLED 902 may travel through the substrate 702 toward a viewer, or through the first SOE photosensor 904, where it is reflected back toward the substrate 702 by the reflecting contact layer 730. The first SOE photosensor 904 detects incoming light that has traveled through the substrate 702 and the SOLED 902. As described in detail below, SOLED light emission and SOE photosensor light detection may occur in a temporally and/or spatially separated manner, such that image capture is essentially unaffected by image display.

Those skilled in the art will recognize that the SOLED 902 and the first SOE photosensor 904 may be able to share a single semitransparent electrode at their interface in an alternate embodiment (i.e., the first full-color emitter/detector 900 may be fabricated without one of the fourth or fifth semitransparent electrodes 812, 912) since SOLED and SOE photosensor operation within a single first full-color emitter/detector 900 may be temporally separated). Those skilled in the art will also understand that in addition to the layers described above, the first full-color emitter/detector 900 may include additional microoptic layers and/or one or more antireflective layers. Those skilled in the art will further recognize that in an alternate embodiment, the first full-color emitter/detector 900 could be fabricated such that the first SOE photosensor 904 resides in contact with the substrate 702, and the SOLED 902 resides on top of the first SOE photosensor 904. In such an embodiment, the reflecting contact layer 730 would be incorporated into the SOLED 902. Those skilled in the art will also recognize that either or both of the SOLED 902 and the first SOE photosensor 904 could be implemented using other types of transparent or semitransparent full-color device and/or materials technologies in alternate embodiments.

Figure 22:
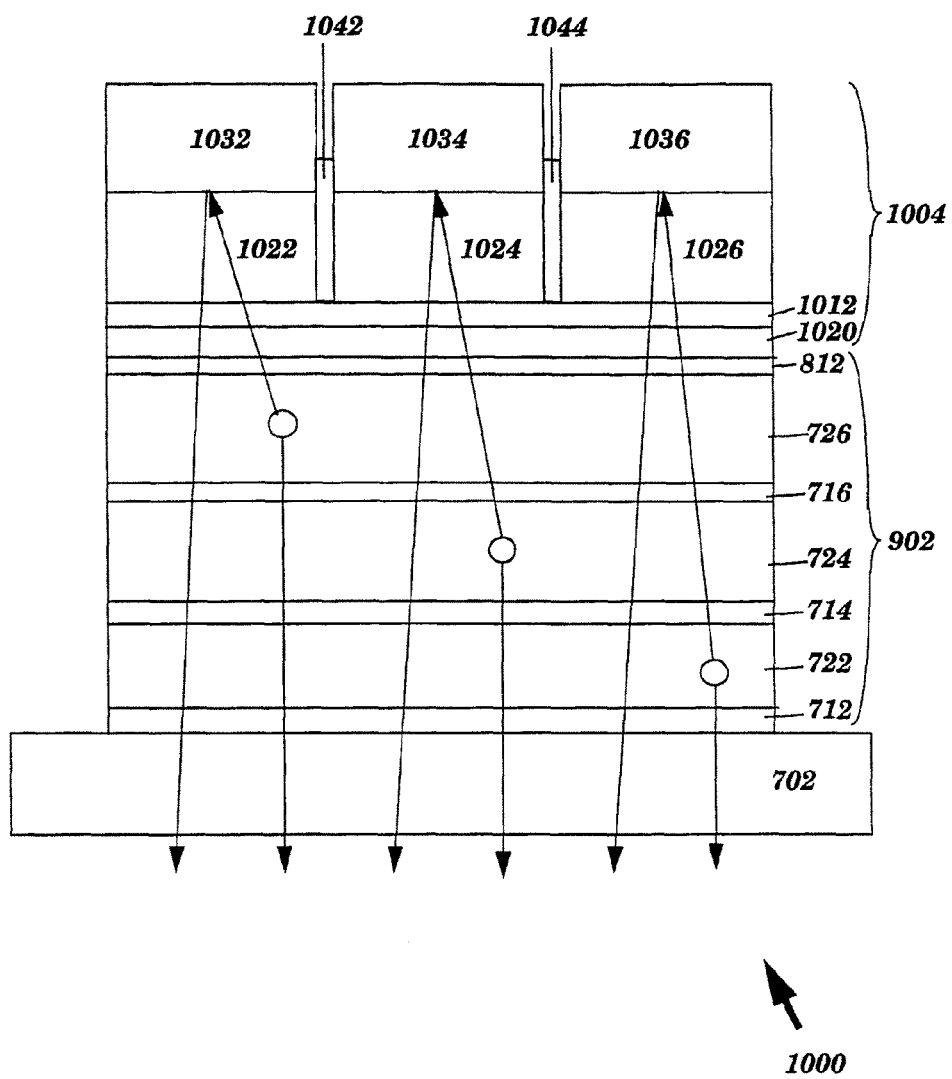
FIG. 22 is a cross-sectional view of a second full-color emitter/detector.

FIG. 22 is a cross-sectional view of a second full-color emitter/detector 1000. For ease of understanding, the second full-color emitter/detector is considered to be based upon SOE technology in the following description. Those skilled in the art will recognize that other full-color materials technologies could be employed to produce the second full-color emitter/detector 1000 in alternate embodiments.

Relative to FIG. 20, like reference numbers designate like elements. The second full-color emitter/detector 1000 is fabricated upon a substrate 702 such as glass, and comprises a first through fifth semitransparent electrode 712, 714, 716, 812, 1012; a first through sixth organic electroluminescent layer 722, 724, 726, 1022, 1024, 1026; an optional microoptic structure 1020; a first, a second, and a third reflecting contact layer 1032, 1034, 1036; and a first and a second boundary structure 1042, 1044.

The first through third organic electroluminescent layers 722, 724, 726, in conjunction with the first through fourth semitransparent electrodes 712, 714, 716, 812, form a SOLED 902 in a manner analogous to that described above with reference to FIG. 21. The microoptic structure 1020, the first through third organic electroluminescent layers 1022, 1024, 1026, the reflecting contact layers 1032, 1034, 1036, and the first and second boundary structures 1042, 1044 form a second SOE photosensor 1004.

Taken together, the fourth, fifth, and sixth organic electroluminescent layers 1022, 1024, 1026 and the boundary structures 1042, 1042 span an area essentially equal to that of any semitransparent electrode 712, 714, 716, 812, 1012. The first boundary structure 1042 separates the fourth and fifth organic electroluminescent layers 1022, 1024. Similarly, the second boundary structure 1044 separates the fifth and sixth organic electroluminescent layers 1024, 1026. The first, second, and third reflecting contact layers 1032, 1034, 1036 respectively reside upon or atop the fourth, fifth, and sixth organic electroluminescent layers 1022, 1024, 1026.

The microoptic structure 1020 may comprise one or more microlenses, apertures, and/or other planar microoptic structures that focus incoming light into the fourth, fifth, and sixth organic electroluminescent layers 1022, 1024, 1026. The fourth organic electroluminescent layer 1022 detects incoming photons having a wavelength range associated with a particular color, for example, red. The presence of such photons in the fourth organic electroluminescent layer produces or induces a voltage difference between the fourth semitransparent electrode 1012 and the first reflecting contact layer 1032. Similarly, the fifth and sixth organic electroluminescent layers 1024, 1026 each detect incoming light corresponding to a particular wavelength range, for example, green and blue, respectively. The presence of blue and green light respectively induces a voltage difference between the second and third reflecting contact layers 1034, 1036 and the fourth semitransparent electrode 1012.

Those skilled in the art will recognize that the thickness of each of the fourth, fifth, and sixth organic electroluminescent layers 1022, 1024, 1026 may be varied in accordance with the particular wavelength range that each such layer is to detect. Those skilled in the art will additionally recognize that the microoptic structure 1020 may be fabricated such that its characteristics vary laterally from one organic electroluminescent layer 1022, 1024, 1026 to another, and that one or more antireflection layers may be incorporated into the second full-color emitter/detector 1000. Moreover, the SOLED 902 and the second SOE photosensor 1004 may be able to share a single semitransparent electrode at their interface a manner analogous to that described above relative to the first SOE photosensor 904. Finally, those skilled in the art will recognize that either or both of the SOLED 902 and the second SOE photosensor 1004 could be implemented using other types of transparent or semitransparent full-color technologies in alternate embodiments.

4.8 Other Integrated Emitter/Detector Structures

As indicated above, a light detecting element may be similar, nearly, or essentially identical in structure and/or composition to a light emitting element. Because any given emitter/detector structure may be used for light emission during one time interval and light detection during another time interval as described below, a single light emitting structure may also be used for light detection.

Figure 23:
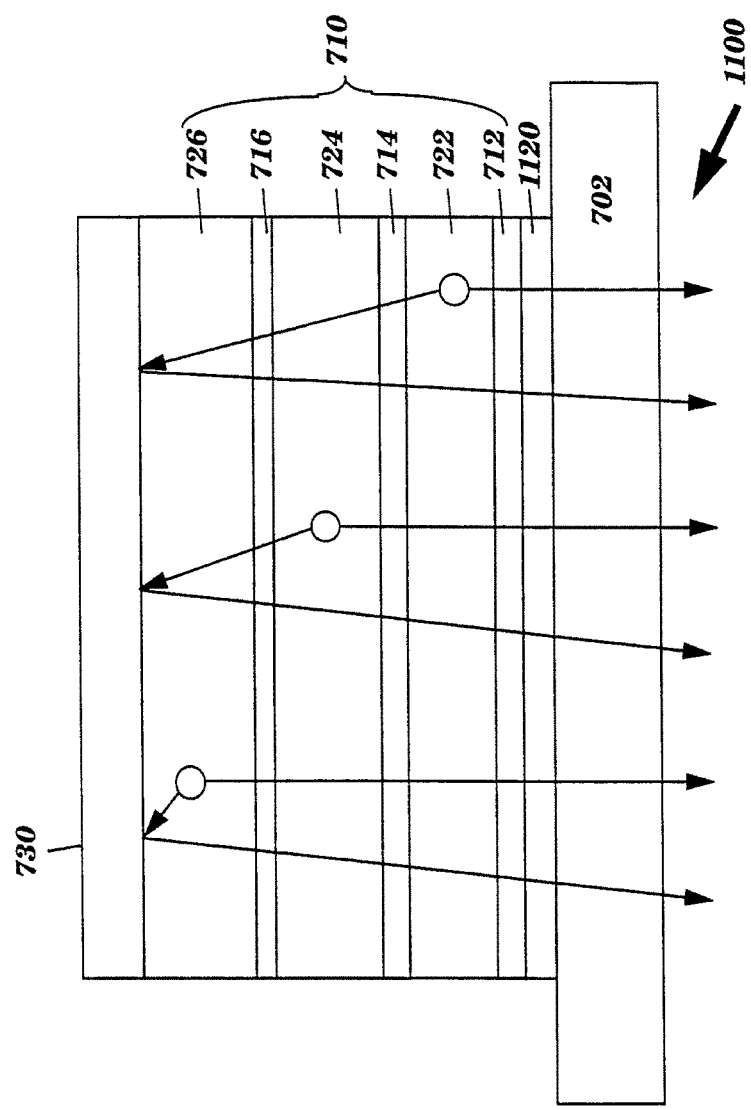
FIG. 23 is a cross-sectional view of a third full-color emitter/detector.

FIG. 23 is a cross-sectional diagram of a third full-color emitter/detector 1100. For ease of understanding, the third full-color emitter/detector is described hereafter in the context of SOE technology. Those skilled in the art will understand that other full-color materials and/or technologies could be employed to produce the third full-color emitter/detector 1100 in alternate embodiments.

Relative to FIG. 19, like reference numbers designate like elements. The third full-color emitter/detector 1100 is fabricated upon a substrate 702 such as glass or plastic. The third full-color emitter/detector 1100 comprises a SOLED 710 having a first through a third semitransparent electrode 712, 714, 716; a first, a second, and a third organic electroluminescent layer 722, 724, 726; a reflecting top contact layer 730. The third full-color emitter/detector 1000 may additionally include a microoptic layer 1120. During a first time interval, the SOLED 710 may operate in a light emitting mode in a conventional manner. During a second time interval, the SOLED 710, in conjunction with the microoptic layer 1120, operates as a photosensor to detect incoming light in a manner analogous to that described above relative to the SOE photosensors 904.

The microoptic layer 1120 may comprise a microlens and/or other type of planar optic structure, and may be fabricated such that different portions of the microoptic layer 1120 affect light in different manners. This in turn could aid in providing particular light detection responsivity while minimally affecting the manner in which light emitted by the third full-color emitter detector 1100 will be perceived by a human eye.

Figure 24:
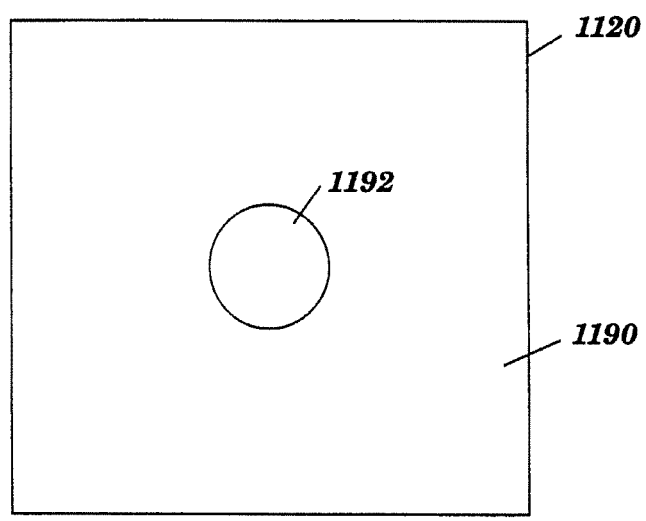
FIG. 24 is a top-view of an exemplary microoptic layer having different optical regions defined therein.

FIG. 24 is a top-view of an exemplary microoptic layer 1120 having different optical regions 1190, 1192 defined therein. A first optical region 1190 may allow light to pass in an essentially unaffected manner. A second optical region 1192 serves as a focusing element that produces a desired spatial or modal light intensity pattern within the third full-color emitter/detector. As the second optical region 1192 occupies a smaller area than the first optical region 1190, its affect upon human perception of light emitted by the third full-color emitter/detector may be small or minimal. Those skilled in the art will understand that the location of the second optical region 1192 may vary among adjacent third full-color emitter/detectors 1100, to further enhance the quality of a displayed image seen by a human eye.

In an alternate embodiment, the microoptic layer 1120 could include additional optical regions. For example, one or more portions of the first optical region 1190 could be designed or fabricated to compensate for any effects the second optical region 1192 has upon human perception of light emitted by the third full-color emitter/detector 1100. As another example, the second optical region 1192 could be replaced or augmented with other, possibly smaller, optical regions distributed across the plane of the microoptic layer 1120 to further optimize light detection and emission characteristics.

4.9 Image Formation

Figure 25:
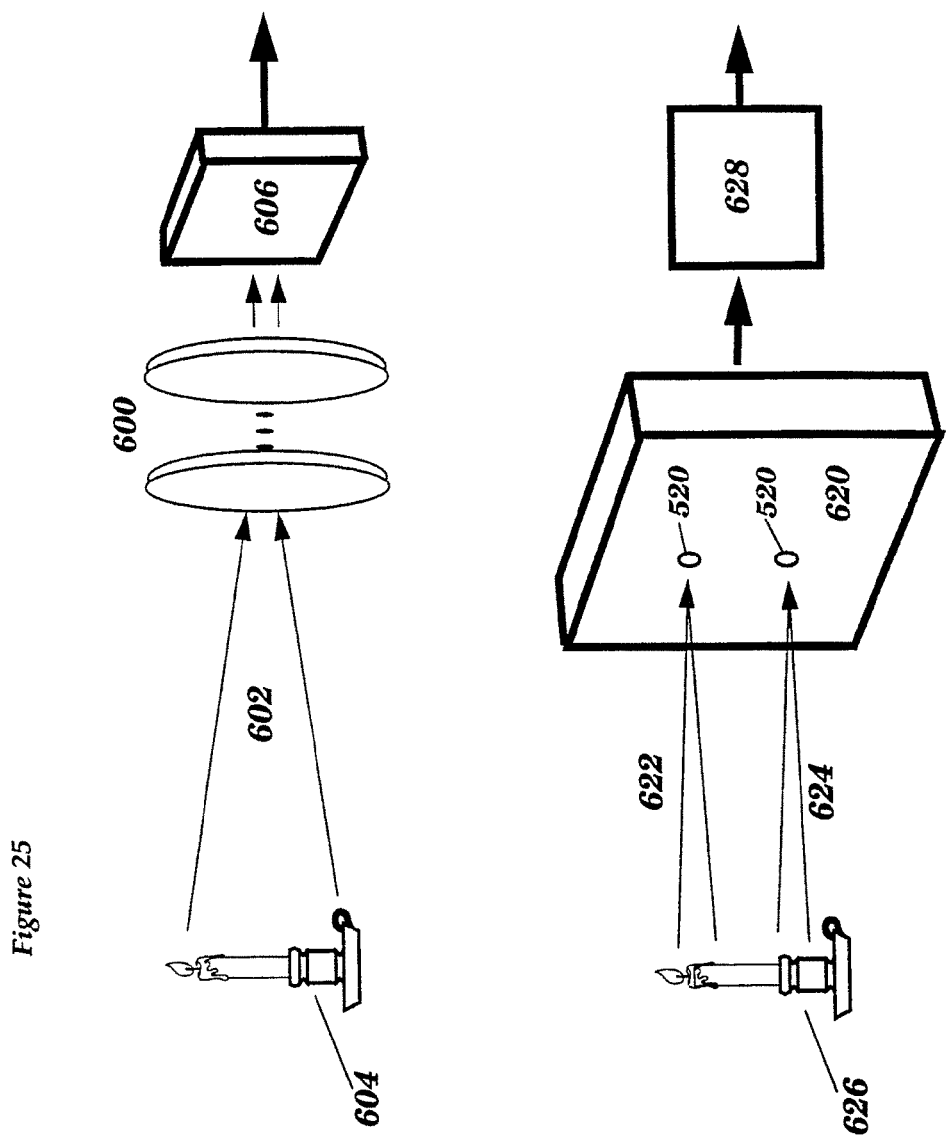
FIG. 25 is an illustration showing individually-apertured photosensor elements capturing light from portions of an object and outputting signals to an imaging unit.

A simple or compound lens is conventionally used to focus an image onto an array of photosensors. FIG. 25 illustrates a simple or compound lens 600 that receives or collects light 602 reflected or emanating from an object 604, and focuses such light onto a photosensor element array 606.

Relative to a single array that integrates both display and photosensor elements 510, 520, the use of a conventional simple or compound lens would adversely affect the characteristics of the displayed image. To facilitate image detection in such an integrated array, photosensor elements 520 may incorporate microoptic structures and/or apertures, as described above, on an individual basis. Each aperture and/or microoptic structure focuses light received from a small portion of an object onto a photosensor element 520. As depicted in FIG. 25, sets of microoptic-equipped photosensor elements 520 within a photosensor array 620 receive light 622, 624 emanating from different parts of an object 626. Those skilled in the art will recognize that the present invention could employ microoptic structures or elements that focus light onto multiple photosensor elements 520 in alternate embodiments, where such microoptic elements may be incorporated onto separates substrates. Signals output by the microoptic-equipped photosensor elements 520 are transferred to an image processing unit 628 for further processing, as described in detail below.

Conventional display devices comprise multiple rows or lines of display elements 510, and produce a displayed image on a line-by-line basis. Similarly, conventional photosensor arrays comprise multiple rows of photosensor elements 520, which may be scanned on a line-by-line basis during image capture operations. The integrated display element/photosensor element arrays considered herein may also 1) produce a displayed image by activating display elements 510 on a line-by-line basis; and 2) capture light received from an object by detecting photosensor element output signals on a line-by-line basis.

In one embodiment, the present invention includes a display control circuit for performing display line scans that produce a displayed image on a line-by-line basis, and a capture control circuit for performing photosensor line scans that read photosensor element output signals on a line-by-line basis. Each of the display and capture control circuits include conventional clocking, address decoding, multiplexing, and register circuitry. In order to ensure that image capture is essentially unaffected by image display (i.e., to prevent light emitted or transmitted by display elements 510 from affecting incoming light detection by adjacent photosensor elements 520), the display line scans and photosensor line scans may be temporally and/or physically separated relative to each other. This separation may be controlled via conventional clocking and/or multiplexing circuitry.

In one embodiment, photosensor line scans are initiated after a display line scan has generated fifty percent of an image (i.e., after fifty percent of the display element lines have been activated during a single full-screen scan cycle), such that the photosensor line scan trails the display line scan by a number of display element rows equal to one-half of the total number of display element rows present in the integrated display element/photosensor element array. More generally, the capture line scan could trail the display line scan by a particular time interval or a given number of completed display line scans.

In another embodiment, one-half of the display element lines define a first display field, and one-half of the display element lines define a second display field, in a manner well understood by those skilled in the art. Similarly, one-half of the photosensor element lines define a first photosensor field, and the remaining photosensor element lines define a second photosensor field. The first display field and either of the first or second photosensor fields may be scanned either simultaneously or in a time-separated manner, after which the second display field and the remaining photosensor field may be scanned in an analogous manner. Those skilled in the art will recognize that the display and photosensor field scanning can be performed in a manner that supports odd and even field scanning as defined for NTSC and PAL television standards.

In yet another embodiment, a single full-screen display line scan cycle is completed, after which a single full-screen photosensor line scan cycle is completed, after which subsequent full-screen display line and photosensor line scans are separately performed in a sequential manner.

The set of photosensor element output signals received during any given photosensor line scan are transferred to an image processing unit 628. The image processing unit 628 comprises signal processing circuitry, such as a DSP, that performs conventional digital image processing operations such as two-dimensional overlap deconvolution, decimation, interpolation, and/or other operations upon the signals generated during each photosensor line scan. Those skilled in the art will understand that the number and types of digital image processing operations performed upon the signals generated during each photosensor line scan may be dependent upon the properties of any microoptic structures associated with each photosensor element 520. Those skilled in the art will further understand that signal conditioning circuitry may additionally be present to amplify photosensor element signals or eliminate noise associated therewith. Such signal conditioning circuitry, or a portion thereof, may be integrated with each photosensor element 520.

The image processing unit 628 forms a conventional final output image array using signal processing methods, and outputs image array signals to a buffer or memory, after which such signals may be compressed and incorporated into data packets and/or converted into analog video signals for subsequent transmission, where the compression and/or conversion may occur in conjunction with associated audio signals.

The signal processing algorithms employed in image formation are determined by the nature of any microoptic elements employed in conjunction with the photosensor elements 520. Such algorithms may perform deconvolution, edge-effect handling, decimation, and/or interpolation operations in a manner understood by those skilled in the art.

For example, if the microoptic elements amount to tiny apertures that limit detector pixel source light to non-overlapping segments in the principal area of view, the signal processing amounts to aggregating the pixels into an array and potentially performing interpolation and/or decimation operations to match the resolution of the pixel detector array to that of the final desired image.

As detection pixels overlap by increasing amounts, the applied signal processing operations can advantageously sharpen the image by deconvolving the impulse response of the pixel overlap function. Depending upon the microoptic arrangement employed, which may be dictated by device cost and fabrication yield or reliability, the overlap impulse response takes on varying characteristics, affecting the algorithm the image processing unit 628 is required to perform. In general, the deconvolution can be handled as either a set of two-dimensional iterated difference equations, which are readily addressed by standard numerical methods associated with the approximate solution of differential equations, or through conversions to the frequency domain and appropriate division operations. Further, if the overlap function is highly localized, which can be a typical situation, the difference equations can be accurately approximated by neglecting higher-order terms, which greatly simplifies the resulting operations. This is in contrast to frequency domain techniques for this case, as localization in the impulse response implies immense nonlocalization in the transform domain. However, should the overlap impulse response itself be far less localized, frequency domain deconvolution methods may be advantageous. Care must be taken in limiting the division to relevant areas when there are zeros in the frequency-domain representation of the overlap impulse response (transfer function).

Edge effects at the boundaries of the pixel detector array can be handled by various methods, but if the overlap impulse response is kept localized by apertures and/or other microoptic elements, then undesirable edge effects in the final image formation (that may result from "brute-force" treatment of the edges) quickly vanish within a few pixels from the boundary of the final formed image. Cropping can then be employed to avoid such edge effect altogether. Thus, by creating a slightly-oversized pre-final image formation array and eliminating edge effect by cropping, a final image array of desired resolution having no edge effects induced by overlap impulse responses can be readily produced.

It is known to those skilled in the art that in general, aperture effects invoked by actual apertures and/or microoptic elements can create diffraction patterns or spatial intensity modes in the light transmitted through the optical structure. Such optical structures may be designed to enhance or eliminate particular modes or diffraction effects, in a manner readily understood by those skilled in the art.

While the teachings presented above have been described in relation to a display device having a camera or image capture capabilities integrated therein or thereupon, the above teachings relating to 1) various photosensor element, microoptic and/or apertured structures; and 2) image processing requirements for creating an array of image signals that correspond to a captured image can be applied to effectively create a camera disposed or integrated upon any one of a wide variety of surfaces or substrates, including glass, plastic, partially-silvered mirrors, or other materials. Photosensor elements 520 disposed upon such substrates may be organized or distributed in a manner similar to that shown above with reference to FIGS. 16, 17, and 18, with the exception that display elements 510 shown in those figures may not be present.

The principles of the present invention have been discussed herein with reference to certain embodiments thereof. Study of the principles disclosed herein will render obvious to those having ordinary skill in the art certain modifications thereto. The principles of the present invention specifically contemplate all such modifications.

The invention claimed is:

1. A display device having image capture capabilities for at least one distant image source, the display device comprising:
    a plurality of display elements;
    a plurality of photosensor elements, the plurality of photosensor elements interleaved with the plurality of display elements in an essentially planar arrangement, such that the essentially planer arrangement can function as a display for the display device and to perform image capture simultaneously;
    wherein the plurality of photosensor elements is configured to receive light from a distant non-adjacent image source separated from the display device by empty space, and
    wherein the photosensor elements create output signals responsive to the received light from a distant non-adjacent image source for presentation to signal processing arranged for image formation to form a synthetic image, the synthetic image responsive to the light received from the distant non-adjacent image source.

2. The display device of claim 1, wherein at least one microoptic structure is associated with a set of photosensor elements.

3. The display device of claim 2, wherein a dedicated microoptic structure is associated with each photosensor element within the set of photosensor elements.

4. A system for image formation comprising:
    a set of photosensor elements, each configured to generate a photosensor output signal in response to light received thereon from a distant non-adjacent object;
    a plurality of display element interleaved with the photosensor element in an essentially planar arrangement such that the essentially planer arrangement can function as a display and to perform image capture simultaneously, the display elements being configured to emit light representative of a respective display signal;
    a plurality of micro-optic elements, each of which is configured to direct light from a portion of the distant non-adjacent object separated from the micro-optic elements by empty space onto a respective subset of the set of photosensor elements; and
    at least one signal processor configured to:
    receive photosensor output signals from the set of photosensor elements,
        perform an image formation operation on the received photosensor output signals to create first image data,
        perform a digital processing operation on the first image data to produce second image data, the digital processing operation including at least one of an edge effect handling operation to remove edge effects, a sharpening operation and an aggregation operation, and
        provide output image data based on the second image data, the output image data representing a portion of an image of the distant non-adjacent object.

5. The system of claim 4, wherein the photosensor elements are arranged in a first array and the micro-optic elements are arranged in a second array.

6. The system of claim 5, wherein the image formation operation includes a deconvolution operation based on an overlap impulse response determined by properties of respective micro-optic elements associated with each of the set of photosensor elements.

7. The system of claim 6 wherein the deconvolution operation comprises a two-dimensional overlap deconvolution operation.

8. The system of claim 4, wherein the sharpening operation comprises removing effects in the first image data due to overlap of the photosensor elements.

9. The system of claim 4, wherein the micro-optic elements are fabricated as a component of respective photosensor elements.

10. The system of claim 4, wherein the micro-optic elements are fabricated using at least one of a micro lens fabrication technique and a planar optic fabrication technique.

11. The system of claim 4, wherein the at least one signal processor is further configured to perform at least one of a decimation operation and an interpolation operation on at least one of the photosensor output signals and the first image data.

12. The system of claim 4, wherein the edge effects are caused by a first set of photosensor elements positioned within a peripheral region of the photosensor array.

13. The system of claim 4, wherein the edge effect handling operation to remove edge effects comprises a crop operation to remove from subsequent processing portions of the first image data.

14. The system of claim 4, wherein the micro-optic elements are configured in a configuration to reduce edge effects in the output image data.

15. The system of claim 4, wherein the micro-optic elements are configured to have a localized overlap impulse response.

16. The system of claim 4, wherein the aggregation operation comprises the aggregation of processed versions of the first image data.

17. A system for image formation comprising:
    a plurality of photosensor elements arranged in a first array;
    a plurality of display elements interleaved with the photosensor elements in an essentially planer arrangement such that the essentially planar arrangement can function as a display and to perform image capture simultaneously, the display elements being configured to emit light representative of a respective display signal;
    a plurality of micro-optic elements, each of the micro-optic elements configured to direct received light from a portion of a distant non-adjacent object separated from the plurality of micro-optic elements by empty space, onto a respective subset of the photosensor elements, each of the photosensor elements configured to generate a photosensor output signal in response to received light;
    a capture control circuit configured to scan the output signals generated by the photosensor elements on a line-by-line basis; and
    an image processing unit configured to:
        receive from the capture control circuit the photosensor output signals generated during a respective photosensor line scan;
        perform at least one digital image processing operation on the photosensor output signals generated during the photosensor line scan; and based on the signals generated by the digital image processing operation, provide respective output image signals, each of which represents a respective portion of an image of the distant non-adjacent object, wherein each of the respective image signals are responsive to receive light from the distant nonadjacent image source.

18. The system of claim 17, further comprising:
signal conditioning circuitry configured to perform at least one signal conditioning operation including at least one of amplifying the photosensor output signals and reducing noise in the output signals generated by the photosensor elements.

19. The system of claim 18, wherein the signal conditioning circuitry is integrated with the plurality of photosensor elements.

20. A method for image formation comprising:
using a plurality of micro-optic elements to direct light received from a portion of a distant non-adjacent object separated from the plurality of micro-optic elements by empty space onto a respective plurality of photosensor elements;
emitting light represented by a display signal by using display elements interleaved with the photosensor elements in an essentially planar arrangement such that the essentially planar arrangement can function as a display for the display device and to perform image capture simultaneously;
generating from each of the photosensor elements a photosensor output signal in response to light received thereon;
receiving the photosensor output signals and performing thereon at least one image formation operation and a digital processing operation, wherein the digital processing operation includes one of an edge effect handling operation to remove edge effects represented in the output signals, a sharpening operation and an aggregation operation; and
outputting from the digital processing operation respective image signals, each of which represents a respective portion of an image of the distant non-adjacent object,
wherein each of the respective image signals is responsive to receive light from the distant nonadjacent image source.

21. The method of claim 20, further comprising:
arranging the plurality of photosensor elements in a first array; scanning the photosensor output signals generated by the photosensor elements on a line-by-line basis; and performing the digital image processing operation on photosensor output signals generated during the line-by-line photosensor scan.

* * * * *